(12) United States Patent
Prabhakar et al.

(10) Patent No.: US 12,273,773 B2
(45) Date of Patent: Apr. 8, 2025

(54) APPARATUS AND METHOD FOR DYNAMIC DATA RATE ADJUSTMENT FOR A WIRELESS SLICE

(71) Applicant: Apple Inc., Cupertino, CA (US)

(72) Inventors: Alosious Pradeep Prabhakar, Singapore (SG); Krisztian Kiss, Cupertino, CA (US); Rohit R. Matolia, Karnataka (IN); Vijay Venkataraman, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/316,568

(22) Filed: May 10, 2021

(65) Prior Publication Data

US 2021/0368395 A1 Nov. 25, 2021

(30) Foreign Application Priority Data

May 22, 2020 (IN) .............................. 202041021677

(51) Int. Cl.
*H04W 28/22* (2009.01)
*H04W 28/02* (2009.01)
*H04W 28/24* (2009.01)

(52) U.S. Cl.
CPC ....... *H04W 28/22* (2013.01); *H04W 28/0257* (2013.01); *H04W 28/0268* (2013.01); *H04W 28/24* (2013.01)

(58) Field of Classification Search
CPC ............. H04W 28/22; H04W 28/0257; H04W 28/0268; H04W 28/24; H04W 28/18;
(Continued)

(56) References Cited

U.S. PATENT DOCUMENTS

| 6,519,461 B1 * | 2/2003 | Andersson ............ H04W 28/18 455/511 |
| 10,932,253 B2 | 2/2021 | Centonza et al. |

(Continued)

FOREIGN PATENT DOCUMENTS

| CN | 108432323 A | 8/2018 |
| EP | 3800917 | * 4/2021 |

(Continued)

OTHER PUBLICATIONS

S2-20004571—ZTE (Year: 2020).*

(Continued)

*Primary Examiner* — Sudesh M Patidar
(74) *Attorney, Agent, or Firm* — Sterne, Kessler, Goldstein & Fox P.L.L.C.

(57) ABSTRACT

Several techniques using a network slice quota (NSQ) management function provide dynamic adjustment in order to meet the limitation of data rate per network slice in the uplink and downlink wireless connections in a wireless network. In one technique, when the limit is reached, the session aggregated maximum bit rates (AMBR) per subscription level is adjusted in proportionate ratio of the maximum bit rate per subscription level per user equipment (UE). In another technique, when the limit is reached, there is a proportionate equivalent increment and decrement of session AMBR based on usage patterns of the subscription levels. In a further technique, when the limit is reached, there is a proportionate equivalent increment and decrement of slice resources based on usage patterns. In yet another technique, a quota update is attempted using the Unified Data Repository (UDR).

20 Claims, 15 Drawing Sheets

(58) Field of Classification Search
CPC ........ H04W 28/0252; H04W 28/0247; H04W 28/0284; H04W 28/10; H04W 36/0011; H04W 60/00; H04W 76/27; H04W 72/1252; H04W 72/04; H04W 72/1278; H04L 41/0895; H04L 41/0896; H04L 41/08; H04L 1/0002
See application file for complete search history.

(56) References Cited

U.S. PATENT DOCUMENTS

| | | | | |
|---|---|---|---|---|
| 2012/0120800 | A1* | 5/2012 | Lientz | H04L 67/563 370/235 |
| 2013/0159495 | A1* | 6/2013 | Wang | H04N 19/146 709/224 |
| 2013/0294246 | A1* | 11/2013 | Geijer Lundin | H04L 47/32 370/235 |
| 2018/0115921 | A1 | 4/2018 | Chen et al. | |
| 2018/0199240 | A1 | 7/2018 | Dao et al. | |
| 2019/0222531 | A1* | 7/2019 | Lin | H04L 41/5022 |
| 2020/0068446 | A1* | 2/2020 | Nimbavikar | H04L 47/20 |
| 2020/0112522 | A1 | 4/2020 | Dannebro et al. | |
| 2020/0275302 | A1* | 8/2020 | Youn | H04W 28/0268 |
| 2020/0337093 | A1* | 10/2020 | Kim | H04W 64/00 |
| 2020/0413283 | A1* | 12/2020 | Shen | H04L 47/115 |
| 2021/0120450 | A1 | 4/2021 | Peng et al. | |
| 2021/0127117 | A1* | 4/2021 | Pan | H04L 65/75 |
| 2021/0136674 | A1* | 5/2021 | Lee | H04W 48/18 |
| 2021/0153157 | A1* | 5/2021 | Jeong | H04W 8/02 |
| 2021/0211970 | A1* | 7/2021 | Lee | H04W 48/06 |
| 2021/0368381 | A1* | 11/2021 | You | H04W 28/0268 |
| 2022/0338106 | A1* | 10/2022 | Ding | H04L 41/5009 |

FOREIGN PATENT DOCUMENTS

| | | | | |
|---|---|---|---|---|
| EP | 3800917 | A1 * | 4/2021 | ............ H04W 76/18 |
| EP | 3800930 | A1 * | 4/2021 | ............ H04W 16/02 |
| GB | 2581392 | A | 8/2020 | |
| KR | 20210059467 | * | 11/2019 | |
| WO | WO2019/0158218 | A1 | 8/2019 | |
| WO | WO2021098104 | * | 3/2020 | |
| WO | WO2021136599 | * | 8/2021 | |

OTHER PUBLICATIONS

"UE-AMBR derivation in NG procedures," R3-180227, 3GPP TSG-RAN WG3 NR AdHoc 1801, Sophia Antipolis, France; Jan. 22, 2018, 18 pages.
"Support of Service Authorization and UE Sidelink AMBR for V2X over NG," R3-194949, 3GPP TSG-RAN WG3 Meeting #105bis, Chongqing, China; Oct. 14, 2019, 36 pages.
"Optimization on QoS Flow related procedures," S2-1911254, SA WG2 Meeting #136, Reno, NV; Nov. 18, 2019, 19 pages.
"Update to Solution #2 Max number of UEs per Network Slice control at registration," S2-2000317, SA WG2 Meeting #136-AH, South Korea; Jan. 13, 2020, 6 pages.
"Solution KI#2: Max number of PDU Sessions per Network Slice control," S2-2001472, SA WG2 Meeting #136-AH, Incheon, South Korea; Jan. 13, 2020, 3 pages.
"Solution for Key Issue #2: Deactivated PDU Session release for efficient PDU Session quota management," S2-2001477, SA WG2 Meeting #136-AH, Incheon, Seoul; Jan. 13, 2020, 4 pages.
"Solution to KI1,2,4,5: Proactive Slice Quota Management in AMF," S2-200xxxx, 3GPP TSG-SA/WG2 Meeting #138E, Elbonia; Apr. 20, 2020; 4 pages.
"Solution for KI#3 on limitation of GBR data rate per network slice in UL and DL per UE," S2-200xxxx, SA WG2 Meeting #1XX Jun. 2020, 4 pages.
"Measures to ensure real-time network access and accurate communication control", Radio & Television Information Network Technology, Jun. 2005, No. 06, pp. 78-81 (includes translation).
"Study on enhancement of network slicing," 3rd Generation Partnership Project; 3GPP TR 23.700 V0.3.0, Technical Specification Group Services and System Aspects; Phase 2 (Release 17); Jan. 2020, 62 pages.
"5G; Procedures for the 5G System (5GS)," 3GPP TS 23.502 version 16.7.0 Release 16, Jan. 2021; 607 pages.
"5G; System architecture for the 5G System (5GS)," 3GPP TS 23.501 version 16.6.0 Release 16, Oct. 2020; 450 pages.
"5G; Policy and charging control framework for the 5G System (5GS); Stage 2," 3GPP TS 23.503 version 16.5.0 Release 16, Jul. 2020; 120 pages.

* cited by examiner

APPARATUS AND METHOD FOR DYNAMIC DATA RATE ADJUSTMENT FOR A WIRELESS SLICE

CROSS-REFERENCE TO RELATED APPLICATIONS

This application claims the benefit of Indian Application No. 202041021677 entitled "Apparatus and Method for Dynamic Data Rate Adjustment for a Wireless Slice," and filed May 22, 2020, the contents of which are hereby incorporated by reference herein.

FIELD

Various aspects generally may relate to the field of wireless communications.

SUMMARY

An aspect is described that is a network node for communicating with mobile devices (e.g., user equipments (UEs)) in a wireless communication system. The network node includes a transmitter configured to transmit data to the UEs, and processor circuitry. The processor circuitry is configured to perform a network slide quota management (NSQ) function, where the NSQ function includes counting a number of the UEs operating in a network slice, counting a number of protocol data unit (PDU) sessions operating in the network slice, and adjusting a data rate limit of at least one of the UEs operating in the network slice based on a predetermined limitation. The processor is further configured to cause to control the transmitter to transmit data to the at least one of the UEs based on the adjusted data rate limit.

Another aspect is a method for communication by a network node with mobile devices (e.g., user equipments (UEs)) in a wireless communication system. The method includes the step of transmitting data to the UEs. The method also includes the steps of performing by a processor a network slide quota management (NSQ) function, where the NSQ function includes: counting a number of the UEs operating in a network slice, counting a number of protocol data unit (PDU) sessions operating in the network slice, and adjusting a data rate limit of at least one of the UEs operating in the network slice based on a predetermined limitation. The method further includes controlling the transmitter to transmit data to the at least one of the UEs based on the adjusted data rate limit.

Figure 1:
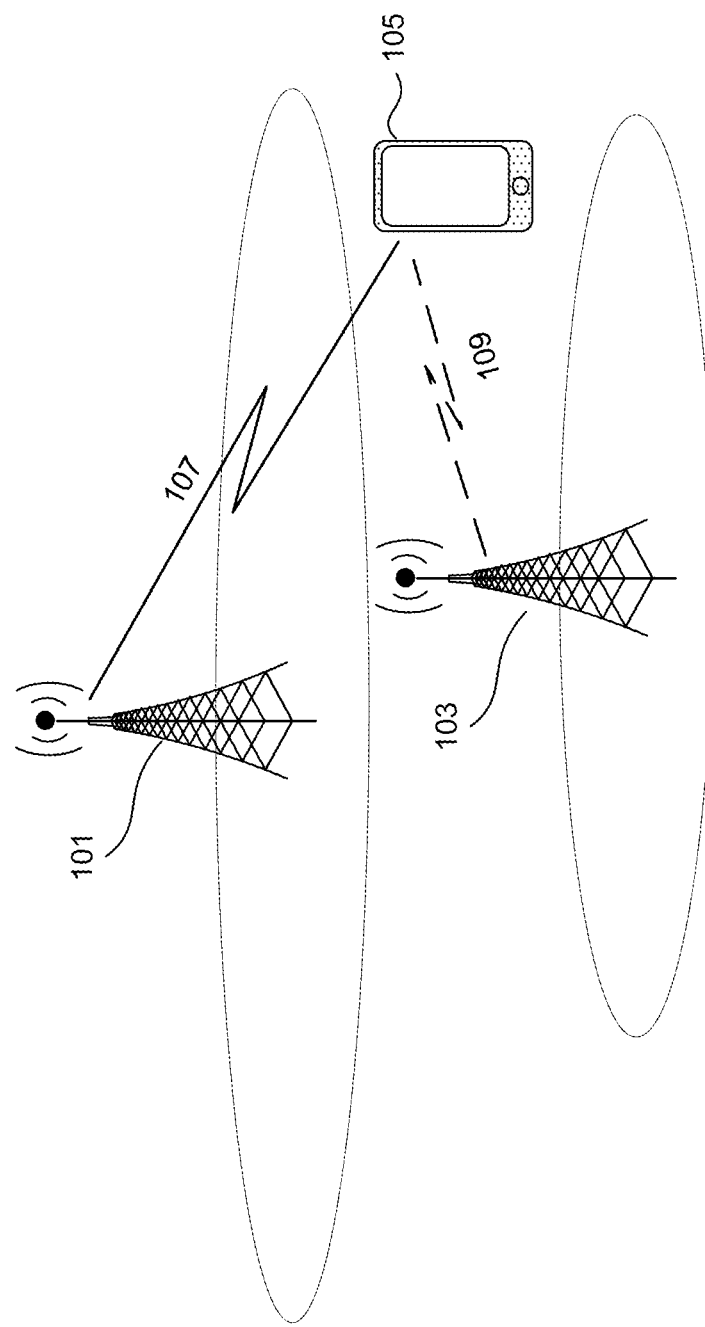
FIG. 1 illustrates an example system 100 implementing mechanisms for communications between an electronic device and a network, according to some aspects of the disclosure.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION

The present disclosure will be described with reference to the accompanying drawings. In the drawings, like reference numbers indicate identical or functionally similar elements. Additionally, the left-most digit of a reference number identifies the drawing in which the reference number first appears.

The following Detailed Description refers to accompanying drawings to illustrate exemplary aspects consistent with the disclosure. References in the Detailed Description to "one exemplary aspect," "an exemplary aspect," "an example exemplary aspect," etc., indicate that the exemplary aspect described may include a particular feature, structure, or characteristic, but every exemplary aspect does not necessarily include the particular feature, structure, or characteristic. Moreover, such phrases do not necessarily refer to the same exemplary aspect. Further, when the disclosure describes a particular feature, structure, or characteristic in connection with an exemplary aspect, those skilled in the relevant arts will know how to affect such feature, structure, or characteristic in connection with other exemplary aspects, whether or not explicitly described.

The exemplary aspects described herein provide illustrative examples and are not limiting. Other exemplary aspects are possible, and modifications may be made to the exemplary aspects within the spirit and scope of the disclosure. Therefore, the Detailed Description does not limit the disclosure. Rather, only the below claims and their equivalents define the scope of the disclosure.

Hardware (e.g., circuits), firmware, software, or any combination thereof may be used to achieve the aspects. Aspects may also be implemented as instructions stored on a machine-readable medium and read and executed by one or more processors. A machine-readable medium includes any mechanism for storing or transmitting information in a form readable by a machine (e.g., a computing device). For example, in some aspects a machine-readable medium includes read-only memory (ROM); random-access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that the actions result from computing devices, processors, controllers, or other devices executing the firmware, software, routines, and/or instructions.

Any reference to the term "module" shall be understood to include at least one of software, firmware, and hardware (such as one or more circuit, microchip, or device, or any combination thereof), and any combination thereof. In addition, those skilled in relevant arts will understand that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary aspects will fully reveal the general nature of the disclosure so that others can, by applying knowledge of those skilled in relevant arts, readily modify and/or customize for various applications such exemplary aspects, without undue experimentation and without departing from the spirit and scope of the disclosure. Therefore, such modifications fall within the meaning and plurality of equivalents of the exemplary aspects based upon the teaching and guidance presented herein. Here, the phraseology or terminology serves the purpose of description, not limitation, such that the terminology or phraseology of the present specification should be interpreted by those skilled in relevant arts in light of the teachings herein.

FIG. 1 illustrates an example system 100 implementing mechanisms for communication between an electronic device and a network, according to some aspects of the disclosure. Example system 100 is provided for the purpose of illustration only and does not limit the disclosed aspects. System 100 may include, but is not limited to, network nodes (for example, base stations such as eNBs, and/or gNBs) 101 and 103 and electronic device (for example, a UE) 105. Electronic device 105 (hereinafter referred to as UE 105) can include an electronic device configured to operate based on a wide variety of wireless communication techniques. These techniques can include, but are not limited to, techniques based on 3rd Generation Partnership Project (3GPP) standards. UE 105 can include, but is not limited to, as wireless communication devices, smart phones, laptops, desktops, tablets, personal assistants, monitors, televisions, wearable devices, Internet of Things (IoTs), vehicle's communication devices, and the like. Network nodes 101 and 103 (herein referred to as base stations) can include nodes configured to operate based on a wide variety of wireless communication techniques such as, but not limited to, techniques based on 3GPP standards.

According to some aspects, UE 105 is configured to communicate to base station 101 and/or the network associated with base station 101 (and/or 103). For example, before connecting to base station 101, UE 105 can search for a cell to attach. After completing the search, UE 105 can perform a Radio Resource Control (RRC) connection setup process. In one example, UE 105 can send an attach request to base station 101 and/or a mobility management entity (MME) (not shown) associated with base station 101. In some examples, the attach request can include an identifier of UE 105. In some aspects, if MME accepts the attach request, MME can send a setup request to, for example, base station 101. In some example, after receiving the setup request, and if base station 101 does not know the capabilities of UE 105, base station 101 can send a request to UE 105 to request the capabilities of UE 105. According to some aspects, UE 105 can send its capabilities to base station 101. In response, base station 101 can send an RRC connection reconfiguration message back to UE 105. Then UE 105 can start data communication using base station 101.

Figure 2:
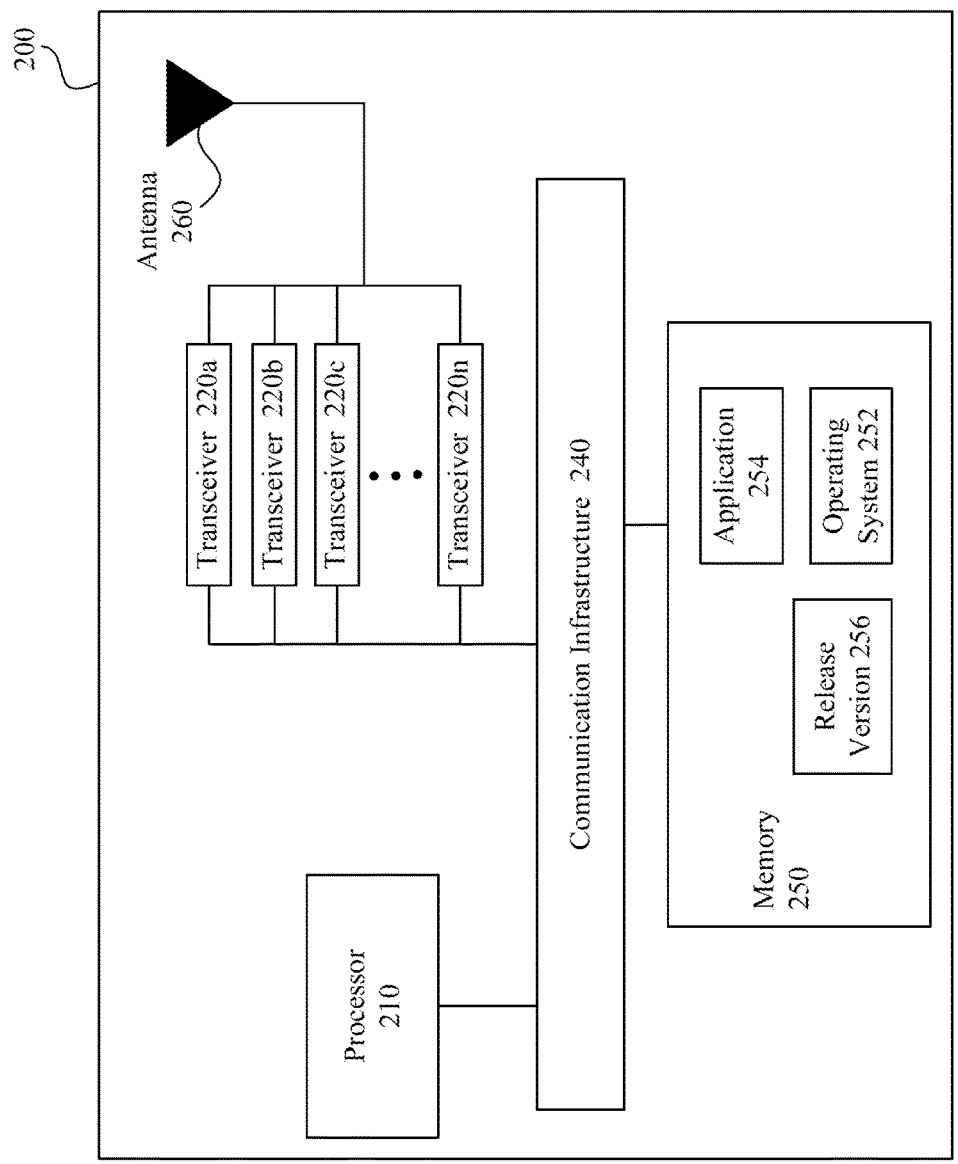
FIG. 2 illustrates a block diagram of an example system of an electronic device implementing communications, according to some aspects of the disclosure.

FIG. 2 illustrates a block diagram of an example system 200 of an electronic device implementing mechanisms for communications, according to some aspects of the disclosure. System 200 may be any of the electronic devices (e.g., base stations 101, 103, UE 105) of system 100. System 200 includes processor 210, one or more transceivers 220a-220n, communication infrastructure 240, memory 250, operating system 252 including release version 256, application 254, and antenna 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220a-220n. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, and/or other user applications.

System 200 can also include communication infrastructure 240. Communication infrastructure 240 provides communication between, for example, processor 210, one or more transceivers 220a-220n, and memory 250. In some implementations, communication infrastructure 240 may be a bus. Processor 210 together with instructions stored in memory 250 performs operations enabling system 200 of system 100 to implement mechanisms for communication, as described herein. Additionally, or alternatively, one or more transceivers 220a-220n perform operations enabling system 200 of system 100 to implement mechanisms for communication, as described herein.

One or more transceivers 220a-220n transmit and receive communications signals that support mechanisms for communications, according to some aspects, and may be coupled to antenna 260. Antenna 260 may include one or more antennas that may be the same or different types. One or more transceivers 220a-220n allow system 200 to communicate with other devices that may be wired and/or wireless. In some examples, one or more transceivers 220a-220n can include processors, controllers, radios, sockets, plugs, buffers, and like circuits/devices used for connecting to and communication on networks. According to some examples, one or more transceivers 220a-220n include one or more circuits to connect to and communicate on wired and/or wireless networks.

Additionally, one or more transceivers 220a-220n can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220a-220n can be configured to operate according to one or more of Rel-15, Rel-16, Rel-17, or later of 3GPP standard.

According to some aspects of this disclosure, processor 210, alone or in combination with computer instructions stored within memory 250, and/or one or more transceiver 220a-220n, implements the communication approaches as discussed herein. For example, transceiver 220a can enable connection(s) and communication over a first carrier (for example, carrier 107 of FIG. 1). In this example, transceiver 220b can enable detecting and/or measuring a second carrier (for example, carrier 109 of FIG. 1), transceiver 220c can enable detecting and/or measuring a third carrier, and transceiver 220n can enable detecting and/or measuring a fourth carrier, concurrently. As discussed above, the first, second, third, and fourth carriers can be associated to same or different base stations.

Additionally, or alternatively, wireless system 200 can include one transceiver configured to operate at different carriers. Processor 210 can be configured to control the one transceiver to switch between different carriers, according to some examples.

According to some aspects of this disclosure, processor 210, alone or in combination with computer instructions stored within memory 250, and/or one or more transceiver 220a-220n, implements mechanisms for communication, as described herein. Although the operations discussed herein are discussed with respect to processor 210, it is noted that processor 210, alone or in combination with computer instructions stored within memory 250, and/or one or more transceiver 220a-220n, can implement these operations. For example, processor 210 is configured to communicate with a base station (and/or a network associated with the base station) as a per-UE capability, during an initial communication discussed above (or any other initial access). Processor 210 can use a RRC layer signaling, a MAC layer, and/or a PHY layer signaling to communicate as a per-UE capability.

By way of background, conventional wireless networks rely on expensive, specialized hardware and software to provide specified services on the wireless network. Equipment for these wireless networks is dedicated and costly, and the challenge is to enable such wireless networks to be as flexible as possible, while still adhering to the relevant wireless standards and contractual service requirements.

The challenge for this and future generations of these wireless networks is to be able to carry a wide variety of services on a single physical network. It is undesirable to overdesign the entire physical network in order to support a wide variety of services, when the diversity of these services will inevitably lead to some of the services not having similar requirements to other services being provided. One solution to this challenge is to provide customizable virtual networks, each having separable operations for each service. Such virtual networks, also known as network slices, provide logically isolated network partitions. Each network slice has one or more units of programmable resources such as computation, connectivity, storage and other core capabilities. By allowing for separate customizable network slices, a network service provider can efficiently support a wide variety of services.

Currently, there is no technique for a public land mobile network (PLMN) to support a per network slice data rate limitation for a user equipment (UE), since current approaches are limited to limitations that are made on a per-PDU session (session-AMBR or MFBR) or made on a per-UE data rate limitation (UE-AMBR), as described in the 3GPPP standard TS 23.501. Aspects of the approach are described below that discuss approaches that limit the data rate of a UE for a network slice, while ensuring that the aggregate of the packet data unit (PDU) sessions that use the network slice are rate limited to the rate defined for the network slice in the downlink (DL) and the uplink (UL) directions in the wireless network. The approaches described below include descriptions of how to signal the rate limits, impacts on subscription data, together with radio access network impacts. Tables 1 and 2 below are illustrative of typical maximum downlink and uplink parameters for a network slice.

TABLE 1

Table 5.3.1-1: Maximum downlink throughput Table

| Parameters | |
|---|---|
| Value | Integer |
| Measurement unit | kbps |
| Example | Bronze customer: 50 000 Kbps |
| | Silver customer: 400 000 Kbps |
| | Gold customer: 1 000 000 Kbps |
| Tags | Character attribute/Functional KPI |
| Attribute Presence | |
| Mandatory | |
| Conditional | |
| Optional | X |

TABLE 2

Table 5.3.1-2: Maximum uplink throughput per UE Table

| Parameters | |
|---|---|
| Value | Integer |
| Measurement unit | kbps |
| Example | Bronze customer: 10 000 Kbps |
| | Silver customer: 100 000 Kbps |
| | Gold customer: 200 000 Kbps |
| Tags | Character attribute/Performance KPI |

TABLE 2-continued

Table 5.3.1-2: Maximum uplink throughput per UE Table

| Attribute Presence | |
|---|---|
| Mandatory | |
| Conditional | |
| Optional | X |

While it is possible for a PLMN to support a per slice data rate limitation (e.g., by appropriate configuration), the network may need to make adjustment to network to control aggregate traffic in UL and DL across the slice. For example, in order to adhere to the generic slice template (GST) parameters, fairness across UE data rates in the PLMN may be triggered when this limit of data rate is reached. Aspects herein address how to adjust the per-UE data rate limits, and how to adjust total number of UEs operating in the network slice. Tables 3 and 4 below are illustrative of typical maximum downlink and uplink parameters for a network slice

TABLE 3

Tabb 5.5.1-1: Maximum downlink throughput Table

| Parameters | |
|---|---|
| Value | Integer |
| Measurement unit | kbps |
| Example | 100 Mbps |
| | 20 Gbps |
| Tags | Scalability attributes |
| | KP |
| Attribute Presence | |
| Mandatory | |
| Conditional | X |
| Optional | |

TABLE 4

Table 5.5.1-2: Maximum uplink throughput

| Parameters | |
|---|---|
| Value | Integer |
| Measurement unit | kbps |
| Example | 100 Mbps |
| | 20 Gbps |
| Tags | Scalability attributes |
| | KP |
| Attribute Presence | |
| Mandatory | |
| Conditional | X |
| Optional | |

Bit rates and flow policing are described in the 3GPP 23.501 v16.4.0 specifications. For example, in clause 5.7.2.5 regarding flow bit rates, for guaranteed bit rate (GBR) quality of service (QoS) flows only, the following additional QoS parameters exist: (a) Guaranteed Flow Bit Rate (GFBR) for UL and DL; (b) Maximum Flow Bit Rate (MFBR) for UL and DL. The GFBR denotes the bit rate that is guaranteed to be provided by the network to the QoS flow over the Averaging Time Window. The MFBR limits the bit rate to the highest bit rate that is expected by the QoS flow (e.g., excess traffic may get discarded or delayed by a rate shaping or policing function at the UE, RAN, UPF). Bit rates above the GFBR value and up to the 1MFBR value, may be provided with relative priority determined by the Priority Level of the QoS Flows (sec clause 5.7.3.3). GFBR and MFBR are signaled to the (R)AN in the QoS Profile and signaled to the UE as QoS Flow level QoS parameter (as specified in TS 24.501 (47)) for each individual QoS Flow. It is noted that the GFBR is recommended as the lowest acceptable service bitrate where the service will survive. It is noted that for each QoS Flow of Delay Critical GBR resource type, the SMF can ensure that the GFBR of the QoS Flow can be achieved with the MDBV of the QoS Flow using the QoS Flow binding functionality described in clause 6.1.3.2.4 in TS 23.503 (45). It is further noted that the network can set MFBR larger than GFBR for a particular QoS Flow based on operator policy and the knowledge of the end point capability, i.e., support of rate adaptation at the application/service level.

Clause 5.8.2.7 of 3GPP 23.501 v16.4.0 addresses PDU Session and QoS Flow Policing. Here, ARP is used for admission control (i.e., retention and pre-emption of the new QoS Flow). The value of ARP is not required to be provided to the UPF. For every QoS Flow, the SMF shall determine the transport level packet marking value (e.g., the DSCP in the outer IP header) based on the 5QI, the Priority Level (if explicitly signaled) and optionally, the ARP priority level and provide the transport level packet marking value to the UPF. The SMF shall provide the Session-AMBR values of the PDU Session to the UPF so that the UPF can enforce the Session-AMBR of the PDU Session across all Non-GBR QoS Flows of the PDU Session. SMF shall provide the GFBR and MFBR value for each GBR QoS Flow of the PDU Session to the UPF. SMF may also provide the Averaging window to the UPF, if Averaging window is not configured at the UPF or if it is different from the default value configured at the UPF.

Clause 5.7.2.6 of 3GPP 23.501 v16.4.0 addresses Aggregate Bit Rates. Each PDU Session of a UE is associated with the following aggregate rate limit QoS parameter: the per Session Aggregate Maximum Bit Rate (Session-AMBR). The Session-AMBR is signaled to the appropriate UPF entity/ies to the UE and to the (R)AN (to enable the calculation of the UE-AMBR). The Session-AMBR limits the aggregate bit rate that can be expected to be provided across all non-GBR QoS Flows for a specific PDU Session. The Session-AMBR is measured over an AMBR averaging window which is a standardized value. The Session-AMBR is not applicable to GBR QoS Flows.

Each UE is associated with the following aggregate rate limit QoS parameter: per UE Aggregate Maximum Bit Rate (UE-AMBR). The UE-AMBR limits the aggregate bit rate that can be expected to be provided across all non-GBR QoS Flows of a UE. Each (R)AN shall set its UE-AMBR to the sum of the Session-AMBR of all PDU Sessions with active user plane to this (R)AN up to the value of the received UE-AMBR from AMF. The UE-AMBR is a parameter provided to the (R)AN by the AMF based on the value of the subscribed UE-AMBR retrieved from UDM or the dynamic serving network UE-AMBR retrieved from PCF (e.g. for roaming subscriber). The AMF provides the UE-AMBR provided by PCF to (R)AN if available. The UE-AMBR is measured over an AMBR averaging window which is a standardized value. The UE-AMBR is not applicable to GBR QoS Flows. NOTE: The AMBR averaging window is only applied to Session-AMBR and UE-AMBR measurement and the AMBR averaging windows for Session-AMBR and UE-AMBR are standardized to the same value.

Clause 5.7.1.8 of 3GPP 23.501 v16.4.0 addresses AMBR/MFBR enforcement and rate limitation. UL and DL Session-AMBR (sec clause 5.7.2.6) shall be enforced by the UPF, if the UPF receives the Session-AMBR values from the SMF as described in clause 5.8.2.7 and clause 5.8.2. 11.4. For UL Classifier PDU Sessions, UL and DL Session-AMBR (see clause 5.7.2.6) shall be enforced in the SMF selected UPF that supports the UL Classifier functionality. In addition, the DL Session-AMBR shall be enforced separately in every UPF that terminates the N6 interface (i.e. without requiring interaction between the UPFs) (see clause 5.6.4). For multi-homed PDU Sessions, UL and DL Session-AMBR shall be enforced in the UPF that supports the Branching Point functionality. In addition, the DL Session-AMBR shall be enforced separately in every UPF that terminates the N6 interface (i.e. without requiring interaction between the UPFs) (see clause 5.6.4). NOTE: The DL Session-AMBR is enforced in every UPF terminating the N6 interface to reduce unnecessary transport of traffic which may be discarded by the UPF performing the UL Classifier/Branching Point functionality due to the amount of the DL traffic for the PDU Session exceeding the DL Session-AMBR. Discarding DL packets in the UL Classifier/Branching Point could cause erroneous PDU counting for support of charging. The (R)AN shall enforce UE-AMBR (see clause 5.7.2.6) in UL and DL per UE for Non-GBR QoS Flows. The UE shall perform UL rate limitation on PDU Session basis for Non-GBR traffic using Session-AMBR, if the UE receives a Session-AMBR. MBR per SDF is mandatory for GBR QoS Flows but optional for Non-GBR QoS Flows. The MBR is enforced in the UPF. The MFBR is enforced in the UPF in the Downlink for GBR QoS Flows. The MFBR is enforced in the (R)AN in the Downlink and Uplink for GBR QoS Flows. For non-3GPP access, the UE should enforce MFBR in the Uplink for GBR QoS Flows. The QoS control for Unstructured PDUs is performed at the PDU Session level and in this Release of the specification there is only support for maximum of one 5G QoS Flow per PDU Session of Type Unstructured. When a PDU Session is set up for transferring unstructured PDUs, SMF provides the QFJ which will be applied to any packet of the PDU Session to the UPF and UE.

Clause 5.7.2.7 of 3GPP 23.501 v16.4.0 addresses Default values. For each PDU Session Setup, the SMF retrieves the subscribed Session-AMBR values as well as the subscribed default values for the 5QI and the ARP and optionally the-5QI Priority Level, from the UDM. The subscribed default 5QI value shall be a non-GBR 5QI from the standardized value range. The SMF may change the subscribed Session-AMBR values (for UL and/or DL), based on interaction with the PCF as described in TS 23.503 or, if dynamic PCC is not deployed, based on local configuration, to set the Session-AMBR values for the PDU Session.

Against the background of the existing 3GPP specification, the inventors have identified new network functionality: network slice quota function (NSQ). NSQ will keep a count of the number of UEs registered & deregistered for a Network. NSQ will keep a count of the number of PDU sessions active for a Network Slice. PDU sessions may be Active PDU sessions (RRC-Connected) or Dormant PDU sessions (RRC-INACTIVE or RRC-IDLE, OR PDU Sessions which have PS Data Off).

Figure 3:
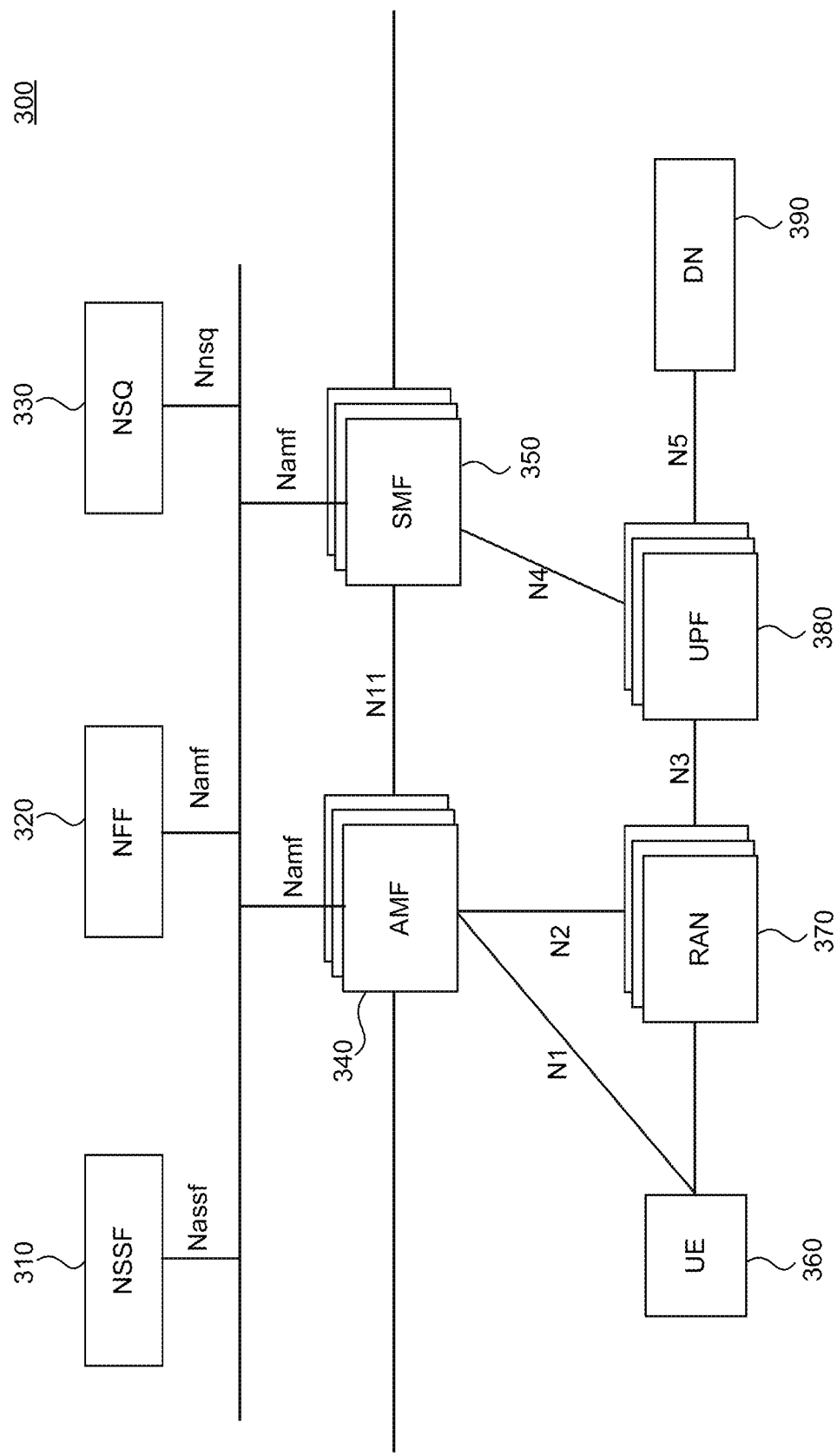
FIG. 3 illustrates a block diagram of the architecture of an example wireless system 300 in which the NSQ functionality is deployed, according to some aspects of the disclosure.

FIG. 3 illustrates a block diagram of the architecture of an example wireless system 300 in which the NSQ functionality is deployed, according to some aspects of the disclosure. FIG. 3 shows NSSF 310, NFF 320 NSQ 330, AMF 340, SMF 350, UE 360, RAN 370, UPF 380 and DN 390. Interfaces N1, N2, N3, N4, N5 and N11 are also illustrated.

The service provided the new NSQ functionality includes Nnsq_DataRate, which is shown in Table 5 below. This service is used by the NSQ to consumers to be updated or be notified about the AMBR of a S-NSSAI. Regarding Nnsq_DataRate_Update, when NSQ has reached the AMBR of the S-NSSAI, NSQ will use this service to update the Session-AMBR and MFBR by x % for non-GBR & GBR sessions respectively. Regarding Nnsq_DataRate_Notify, when the AMBR of S-NSSAI has reached a threshold or the max limit, the consumers are notified.

TABLE 5

| Service Name | Service Operations | Operation Semantic | Known Consumer(s) |
| --- | --- | --- | --- |
| Nnsq_RegistrationCount | UECheck UEAddition UERemoval | Request/Response | AMF, NSSF |
| | Subscribe Unsubscribe Notify | Subscribe/Notify | AMF, NSSF |
| Nnsq_PDUCount | AvailabilityCheck Modification | Request/Response | PCF, AMF, NSSF, NWDAF |
| | Subscribe Unsubscribe Notify | Subscribe/Notify | PCF, AMF, NSSF, NWDAF |
| Nnsq_DataRate | Update | Request/Response | AMF, SMF, PCF |
| | Subscribe Notify | Subscribe/Notify | AMF, SMF, PCF |

In addition to the new NSQ functionality described above, various approaches are described to provide dynamic adjustment to meet the limitation of date rate per network slice in the uplink and downlink directions. The principles of the dynamic adjustment are described below using an exemplary context of GSM Alliance (GSMA) contract qualities. Here, Gold, Silver & Bronze are example contract qualities provided by GSMA depending on the maximum data rate supported. Support may be provided at a per-slice level or at per-UE level per-slice contract qualities. For example, at the per-network slice level, any company that pays more to the wireless operator (based on a service level agreement (SLA)) to get higher data rates for its slice may be a gold network slice customer. For example, were Apple to pay AT&T more for a network slice for Apple services with maximum data rates higher than the customer rates, Apple may be a gold customer for AT&T. Similarly another company paying lower rates to AT&T for a lesser service would be a silver or a bronze network slice customer of AT&T. A similar situation exists at the per-UE contract qualities. For example, a customer who pays more to get better service for an application related to a network slice (e.g., a customer paying an extra premium on top of his/her monthly subscription to enjoy 4K video streaming over cellular) may be a gold customer, while those paying lower monthly subscription prices would be a silver or a bronze customer.

The following technique shows how the new NSQ functionality keeps track of the AMBR criteria for a network slice. AMBR for a S-NSSAI equals the aggregate of Session-AMBR of all non-GBR sessions for the network slice plus the aggregate of MFBR of all GBR session for the slice. AMBR for a S-NSSAI is decided by the operator and provided to the NSSF/NSQ. The decision of the AMBR value could be dependent on the agreement between the operator and the vendor who would request to utilize the slice for a specific purpose. For example, Apple could pay AT&T to allocate a network slice with an AMBR of 1000 Gbps. In one usage scenario, all users subscribed of this slice would be provided with Session-AMBR (non-GBR) of 100 Mbps or MFBR(GBR) of 100 Mbps. In this usage scenario, users would be allocated Session-AMBR and MFBR based on the contract qualities. A gold client would have a Session-AMBR(non-GBR) of 100 Mbps or MFBR(GBR) of 100 Mbps A silver client would have a Session-AMBR(non-GBR) of 75 Mbps or MFBR(GBR) of 75 Mbps. And a bronze client would have a Session-AMBR(non-GBR) of 50 Mbps or MFBR(GBR) of 50 Mbps. The NSQ will maintain the AMBR & AvMBR for a S-NSSAI. When a PDU session is established successfully for an S-NSSAI, the NSQ updates the AMBR & AvMBR as follows: For non-GBR, the Session-AMBR of the established PDU session is reduced from AMBR of the S-NSSAI, AvMBR=(AMBR of S-NSSAI)−(Session-AMBR of the established PDU session). For GBR, the MFBR of the established PDU session is reduced from AMBR of the S-NSSAI, AvMBR=(AMBR of S-NSSAI)−(MFBR of the established PDU session).

Figure 4:
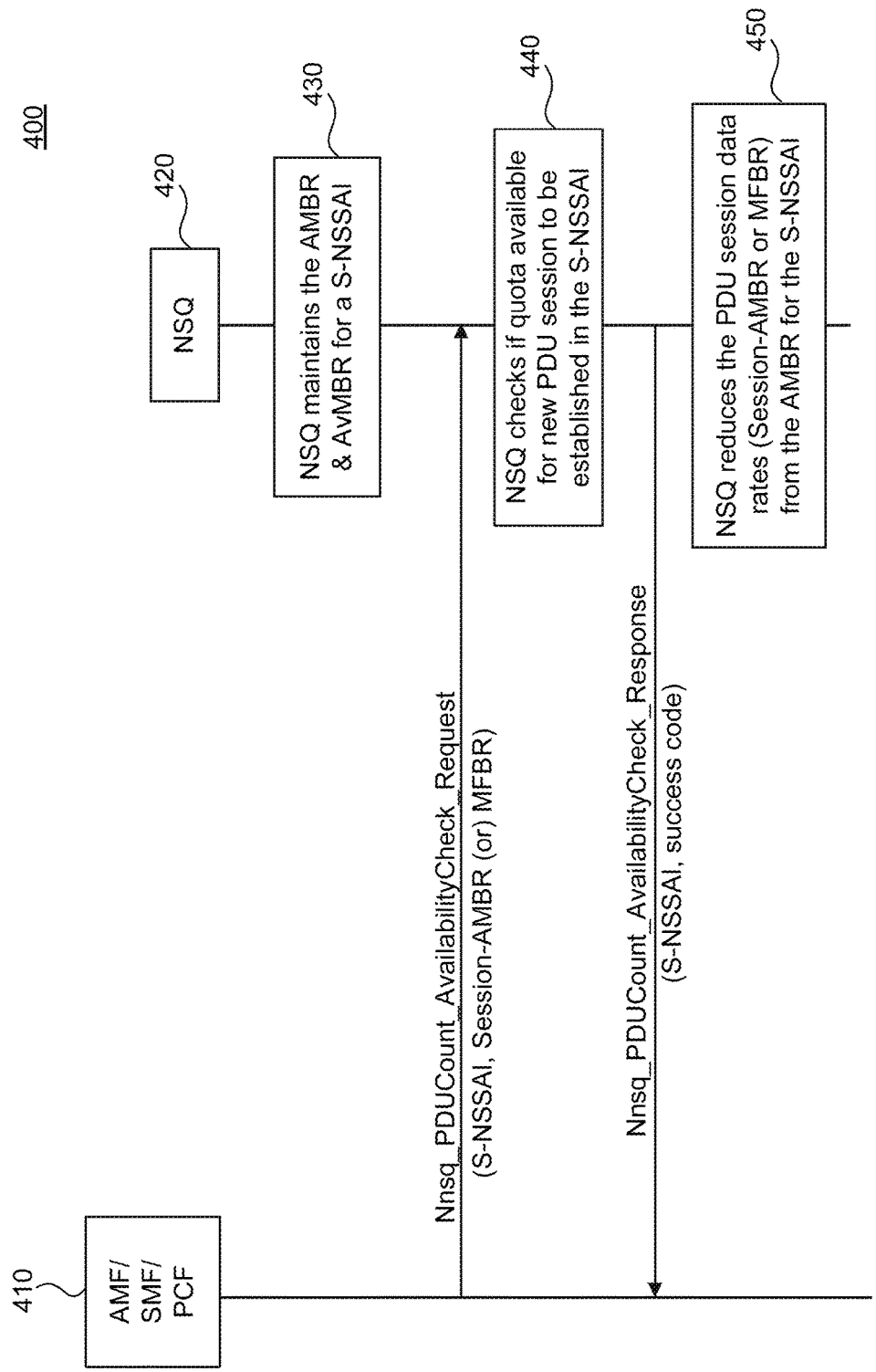
FIG. 4 illustrates the signaling involved for the NSQ to track AMBR criteria for a network slice, in accordance with some aspects.

FIG. 4 illustrates the signaling 400 involved for the NSQ to track AMBR criteria for a network slice, in accordance with some aspects. NSQ 420 contains the functionality that maintains the AMBR and AvMBR for a S-NSSAI (430). AMF/SMF/PCF 410 performs a Nnsq_PDUCount_AvailabilityCheck_Request. In 440, NSQ checks if quota available for a new PDU session to be established in the S-NSSAI. NSQ 420 responds to AMF/SMF/PCF410 with a Nnsq_PDUCount_AvailabilityCheck_Response. In 450, NSQ reduces the PDU session data rates (session-AMBR or MFBR) from the AMBR for the S-NSSAI.

Figure 5:
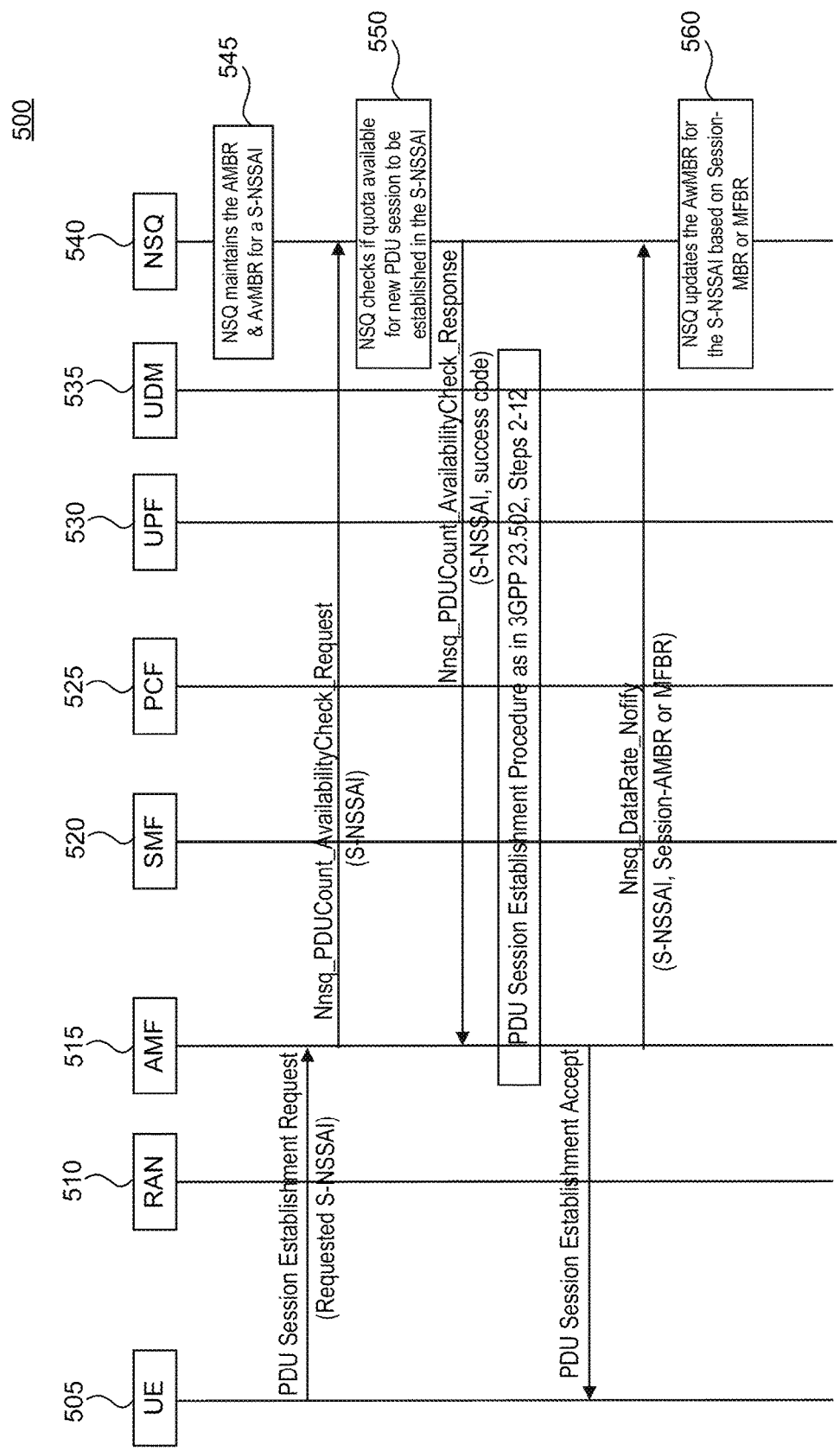
FIG. 5 illustrates PDU establishment call flow, according to aspects of the disclosure.

FIG. 5 illustrates PDU establishment call flow, according to aspects of the disclosure. The entities involved in the PDU establishment call flow are UE 505, RAN 510, AMF 515, SMF 520, PCF 525, UPF 530, UDM 535, and NSQ 540. In 545, NSQ maintains the AMBR and AvMBR for a S-NSSAI. UE 505 initiates a PDU Session Establishment Rest to AMF 515. In response, AMF 515 makes a Nnsq_PDUCount_AvailabilityCheck_Request to NSQ 540. At 550, in response, NSQ checks if quota available for a new PDU session to be established in the S-NSSAI. In response, NSQ 540 forwards a Nnsq_PDUCount_AvailabiltiyCheck_Response to AMF 515. Subsequently, the PDU Session Establishment Procedure follows the procedure outlined in 3GPP 23.502, steps 2-12. Next, AMF 515 issues a PDU Session Establishment Acceptance to UE 505. Also, AMF 515 issues an Nnsq_DataRate_Notify signal to NSQ 540. In 560, NSQ 540 updates the AvMBR for the S-NSSAI based on Session-MBR or MFBR.

Next, the NSQ triggered dynamic adjustment of UE data rates is described. When the limit of AMBR for a S-NSSAI has been reached, NSQ will initiate a notification to the AMF with the following information: S-NSSAI (for which the limit is reached), a cause code, the percentage of QoS to reduce for the established PDU sessions of the S-NSSAI. In an alternative, the percentage would be same for Gold/Silver/Bronze UEs (to maintain fairness) or different. These percentage reductions could be implementation specific. For example, all UE(s) would get a 10% reduction in size, or only the Bronze & Silver category UE(s) would get the reduction while no change for Gold. AMF would inform SMF about the change and SMF, with updated PCC rules from PCF, will trigger a PDU Modification with an updated QoS. In some cases, the NSQ could send the notification to SMF. SMF would inform the UPF, RAN and optionally the UE about the changes.

Figure 6:
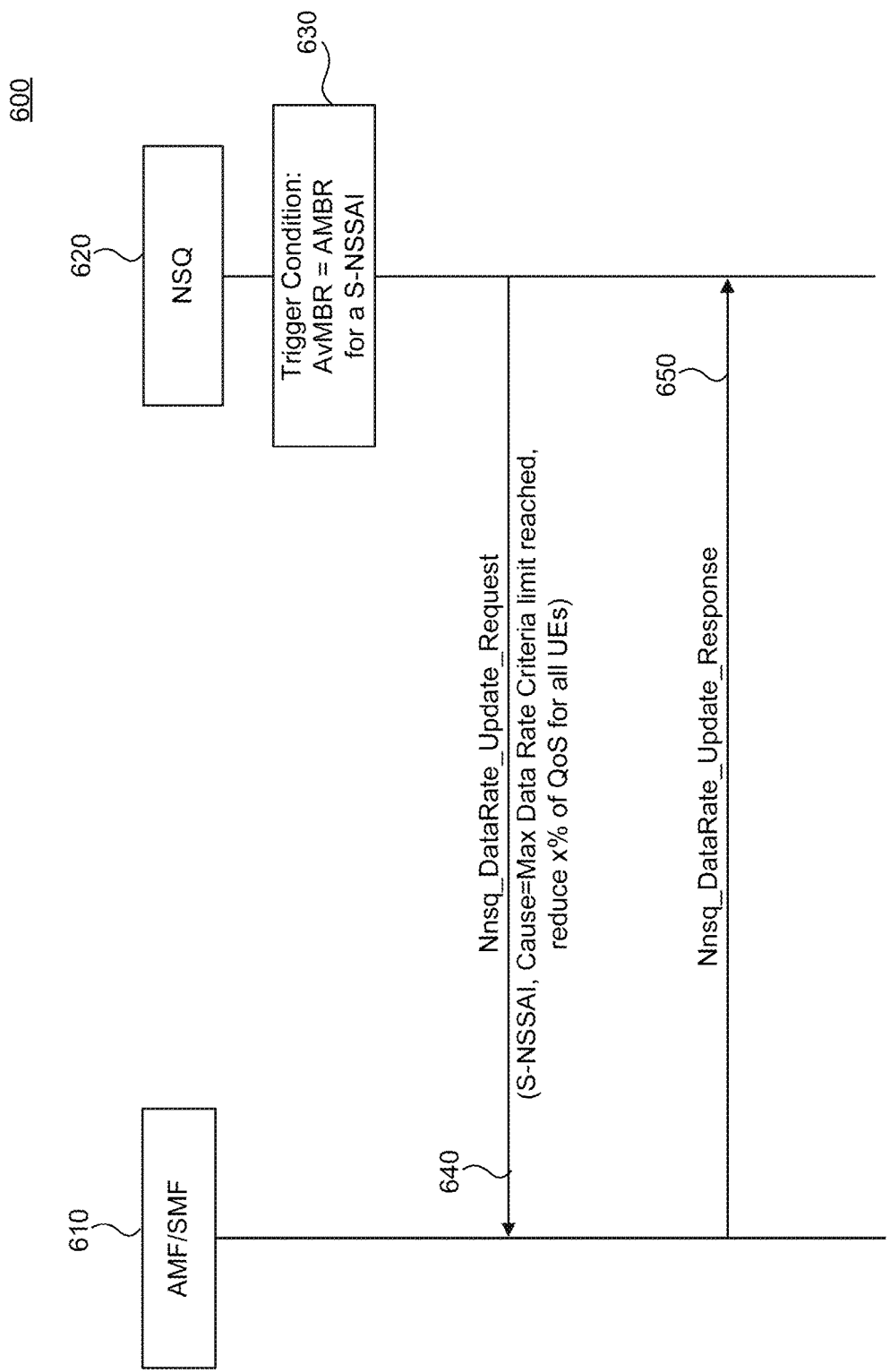
FIG. 6 illustrates the NSQ-triggered dynamic adjustment of UE data rates, according to aspects of the disclosure.

FIG. 6 illustrates the NSQ-triggered dynamic adjustment 600 of UE data rates, according to aspects of the disclosure. The entities involved are 610 AMF/SMF and NSQ 620. In 630, the trigger condition is when AvMBR equals AMBR for a S-NSSAI. Upon that trigger condition being met, NSQ 620 initiates an Nnsq_DataRate_Update_Request 640. In response, AMF/SMF 610 Nnsq_DataRate_Update_Response 650 is provided to NSQ 620.

In an alternative approach, NSQ would provide only a cause code and S-NSSAI to AMF when the limit is reached. AMF would inform SMF, and SMF would inform PCF. PCF would determine the percentage of QoS to reduce, and create new PCC rules for SMF. It is noted that PCF would check with UDM and decide the percentage in some implementations. SMF would send the updated QoS to RAN/UE via the PDU modification procedure defined in 23.502, 4.3.3.2

A negative scenario is also described, as follows. In case even after a QoS reduction if the max data rate criteria limit is reached, the NSQ would advise AMF/SMF to reject any new PDU Session Establishment Request for the S-NSSAI. An existing cause code could be used or a new cause code may need to be defined in this case. Here, there are insufficient resources for specific slice or the DNN, AMBR limit of slice may be reached.

Figure 7:
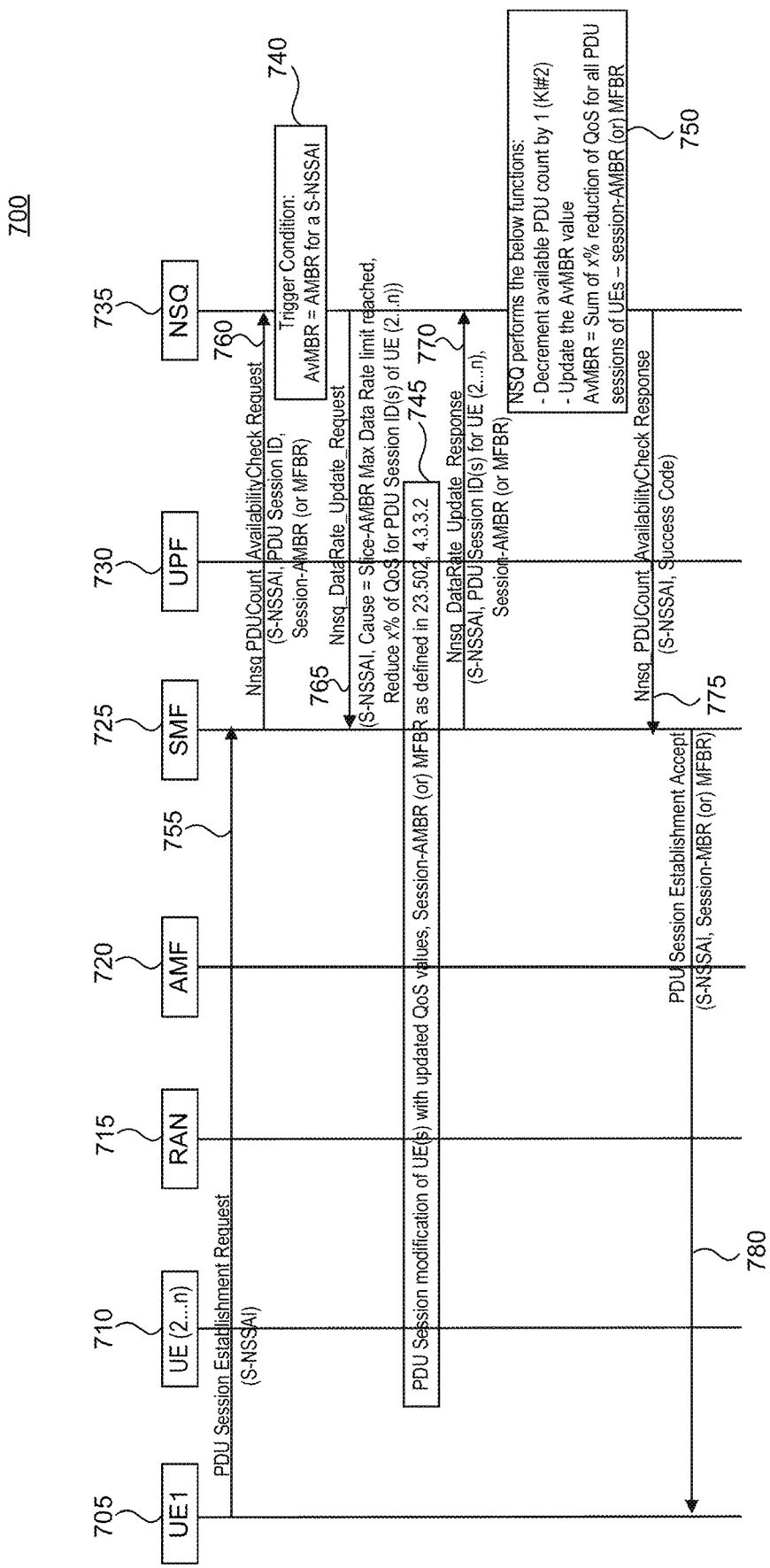
FIG. 7 illustrates the signaling for reducing QoS of existing PDU sessions when a limit is reached, according to aspects of the disclosure.

FIG. 7 illustrates the signaling 700 for reducing QoS of existing PDU sessions when a limit is reached, according to aspects of the disclosure. The entities involved in this signal flow are UE1 705, UE (2 . . . n) 710, RAN 715, AMF 720, SMF 725, UPF 730, and NSQ 735. In 755, UE1 705 makes a PDU session establishment request 755 to SMF 725. SMF 725 provides a Nnsq_PDUCount_AvailabilityCheck_Request 760 to NSQ 735. NSQ 735 monitors the trigger condition AvMBR=AMBR (740). In response to the trigger condition being met, NSQ 735 sends an Nnsq_DataRate_Update_Request 765 to SMF 725. In some embodiments, the NSQ would send the request to all the SMF(s) which have an active PDU session associated with the slice. In response, the SMF 725 initiates the PDU Session modification of UE(s) with updated QoS values, Session-AMBR or MFBR proceeds as described in 3GPP 23.502, clause 4.3.3.2 (745). After completion of PDU modification procedure in 745, SMF 725 provides an Nnsq_DataRate_Update_Response 770 to NSQ 735. As noted in 750, NSQ 735 provides the following functionality: decrement available PDU count by 1, update the AvMBR value, where AvMBR is the sum of x percentage reduction of QOS for all PDU Sessions of UEs (session-AMBR or MFBR). In 775, NSQ 735 sends an Nnsq_PDUCount_AvailabilityCheck_Response to the SMF 725. SMF 725 sends PDU Session Establishment Acceptance signal 780 to UE1 (705).

The next step of reducing the QoS of existing PDU sessions when limit reached is now described. The following methodology is used by NSQ to perform a percentage of reduction when the Max Limit is reached: In the case of non-GBR sessions, an x percentage could be reduced from Session-AMBR of all PDU sessions. For example, the "x" could be 10% across all contract qualities (Gold/Silver/Bronze). In another example, one could keep reducing by 10% until a certain limit is reached, e.g., until 70% of the initial Session-AMBR is reached. After this limit, if new PDU session establishment requests are received, these PDU requests would be rejected with a cause code. In the case of GBR sessions, one could reduce GFBR from MFBR and then add the x percentage reduction. For example, if MFBR is 100 Mbps and GFBR is 20 Mbps, one could reduce x % from 80 Mbps (100–20). This guarantees the PDU session would never be reduced below GFBR. In another example, "x" could be 10% across all contract qualities (Gold/Silver/Bronze). In a further example, one could keep reducing 10% until MFBR=GFBR After this limit, if new PDU session establishment requests are received, the PDU requests would be rejected with a cause code. In some cases, data rates of Non-GBR sessions could be reduced first until a threshold is reached, after which the GBR sessions are reduced. The value of "x" may be defined by the operator and it could be based on number of PDU sessions for the S-NSSAI, including both GBR and non-GBR.

In the description above, UEs 2 . . . n go through the PDU Session Modification signaling procedure, which may cause a lot of signaling in the 5GC. In an alternative approach, one may use an in-band SDAP-based QoS modification in which signaling is substantially reduced. In this alternative approach, as part of the downlink IP packet sent to the user, 5GC will modify the QFI in the DRB associated with the slice-specific PDU session. QFI has 1:1 association with the MFBR and GFBR, as part of the QoS rules configured by network in initial PDU Session Establishment Accept procedure. Thus, utilizing this procedure, one can reduce the excessive signaling over control plane, and leverage the data plane for efficient QoS modification. This approach is limited to GBR PDU sessions.

Figure 8:
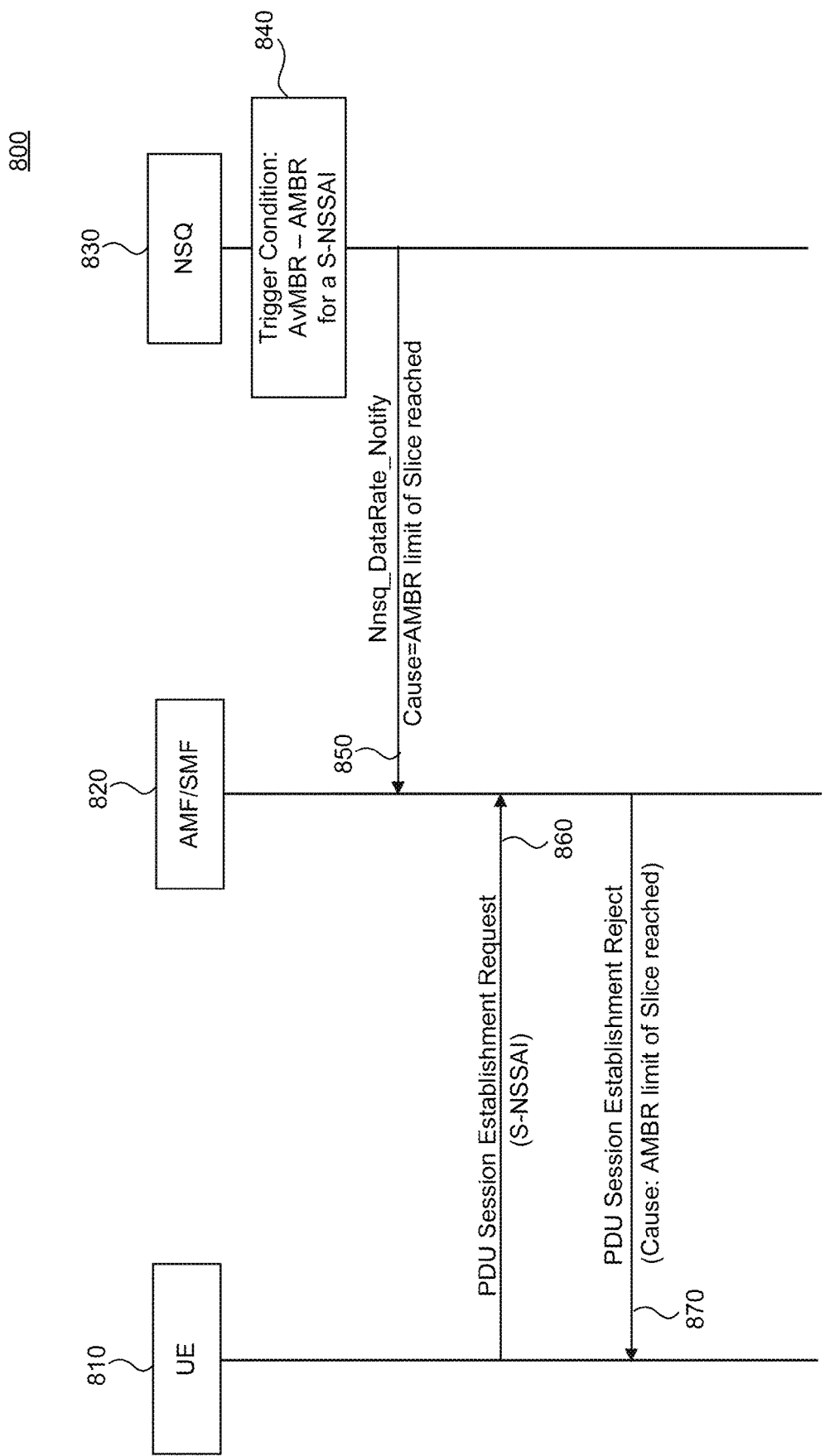
FIG. 8 illustrates the signaling for rejection of a PDU request when the limit is reduced, in accordance with aspects of the disclosure.

FIG. 8 illustrates the signaling 800 for rejection of a PDU request when the limit is reduced, in accordance with aspects of the disclosure. The entities involved are UE 810, AMF/SMF 820 and NSQ 830. NSQ 830 monitors trigger condition AvMBR=AMBR (840). When the trigger condition is reached, NSQ 830 signals AMF/SMF 820 with a Nnsq_Data_Rate_notify 850. When UE 810 attempts to establish a PDU Session, it sends a PDU Session Establishment Request 860 to AMF/SMF 820. Since AMF/SMF 820 has been notified of the limit being reached, AMF/SMF 820 sends a PDU Session Establishment Reject 870 to UE 810 with an appropriate cause code.

A variety of proposals are now described for alternative solutions as to how the bit rate changes may be accommodated. These proposals include: (1) a proportional rate change between subscription levels for the quantized bit rate (QBR); (2) a flexible S-AMBR ratio change with an AMF Request, including changes over subscription levels during session setup and after session setup; (3) NWDAF-based data rate adjustment analytics and reductions with an AF Request; and (4) Quota update request based on an AMF Request.

Turning now to the proportional rate change between subscription levels for the quantized bit rate (QBR). The parameters involved in this proposal (Proposal 0) are: Slice AMBR: Maximum Bit rate supported per Slice; Session AMBR: Maximum Bit rate per Subscription level per UE; S-AMBR: Session AMBR Max Bit rate for ongoing Session on User Plane (UP) per subscription Level (this is Session AMBR locally at SMF/UPF, not communicated to UEs, comes into picture only when Max reached, will return to Session AMBR initial value when enough resources available); GFBR: Minimum Bit rate supported per Subscription Levels; and Quantized Bit Rate (QBR): Minimum Bit Rate block which can be increased or decreased from S-AMBR (Can be minimum Bit Rate change supported by NW slice or NW instance FFS). Note that the Slice AMBR>=Gold (User Count x S-AMBR)+Silver (User count x S-AMBR)+Bronze (User count x S-AMBR). Note that Session AMBR>=S-AMBR>=GFBR. Note that Max value of S-AMBR is Session AMBR & Minimum is GFBR. NF:NSQ or OAM may have information about S-/Slice/Session AMBR, which would be a multiple of QBR.

This first proposal (Proposal 0) works as follows. When data rate limit is reached or the Slice AMBR with provided S-AMBR (greater than GBR but lower than Session AMBR) per Subscription levels, then the following change takes place: Change S-AMBR per Subscription level in proportional ratio of Session AMBR. For example, in the case where a Gold Session AMBR=2×Silver Session AMBR=4× Bronze Session AMBR, then decrease S-AMBR with same ratio in User Plane, as Session AMBR per Subscription Levels. These shall be done in blocks of QBR.

Two examples illustrate this first proposal. The first example involves the case of QBR for a carrier, e.g., AT&T of 100 Mbps where Apple is subscribed to an AT&T Slice of 100 Gbps (S-AMBR=1000QBR). Here the Slice GBR is 0.5 Gbps/5QBR for all subscription levels. Apple User Category (where max=Session AMBR and min=GBR) Gold: max 8 Gbps (min 2 Gbps), Silver: max 4 Gbps (min 1 Gbps) and Bronze: max 2 Gbps (min 0.5 Gbps). In this example, the Current Active user count is: 5 Gold, 10 Silver & 20 Bronze. The Slice AMBR can be P % utilized without triggering change, with all users getting S-AMBR close to Session AMBR: (P is implementation dependent, here 100%). S-AMBR for each Gold user=64QBR, each Silver user=32QBR, each Bronze user=16QBR. (QBR are proportionally divided between different subscription levels, 40QBR in reserve).

If a new user is introduced or subscription level changed (here new user introduced with Gold UE as an example). 40QBR reserve cannot satisfy, as current Average Gold UE S-AMBR is 64. The underlying calculations at NSQ are: 5G+10S+20B=1000QBR (using 960QBR), new mode: 6G'+10S'+20B'=1000QBR where G, S & B will contribute their QBR in a proportional level to ensure new G user gets equivalent QBR count for S-AMBR Solution: Updated S-AMBR Bronze user=15QBR, Silver user=30QBR, Gold user (including new)=60QBR (total 960QBR used, 40QBR in reserve) (S-AMBR for previous Gold user=64QBR, each Silver user=32QBR, each Bronze user=16QBR) where 1 QBR=0.1 Gbps.

The second example involves the case of a Slice Level GBR. In this example, the QBR for AT&T is 100 Mbps, and Apple is subscribed to an AT&T Slice of 100 Gbps (S-AMBR=1000QBR), the Slice GBR: 0.5 Gbps/5QBR for all Subscription Levels, the Apple User Categories (where max is Session AMBR & min is Slice GBR) are Gold: max 8 Gbps Silver: max 4 Gbps Bronze: max 2 Gbps. The Current Active user count: 20 Gold, 40 Silver & 40 Bronze. Slice AMBR can be P % utilized without triggering change, with all users getting S-AMBR close to Slice GBR: (P is implementation dependent, here 100%) S-AMBR for each Gold user=20QBR, each Silver user=10QBR, each Bronze user=5QBR (QBR are proportionally divided between different subscription levels, 0QBR in reserve).

If a new user is introduced or subscription level changed (here new user introduced with Gold UE as example) 0QBR reserve cannot satisfy, as current Average Gold user S-AMBR is 20, also we cannot strip Bronze S-AMBR anymore. The calculations at NSQ are: 20G+40S+40B=1000QBR, new mode: 21G'+40S'+40B=1000QBR (Bronze becomes constant after reaching Slice GBR)) now G & S S-AMBR will contribute their QBR in a proportional level to ensure new S user gets equivalent QBR count. The solution is as follows: Updated S-AMBR Bronze user=5QBR, updated Silver user=9QBR, Gold user (including new)=19QBR (total 959QBR used, 41QBR in reserve). Note that the previous values were as follows: S-AMBR Gold user=20QBR, each Silver user=10QBR, each Bronze user=5QBR.

Figure 9:
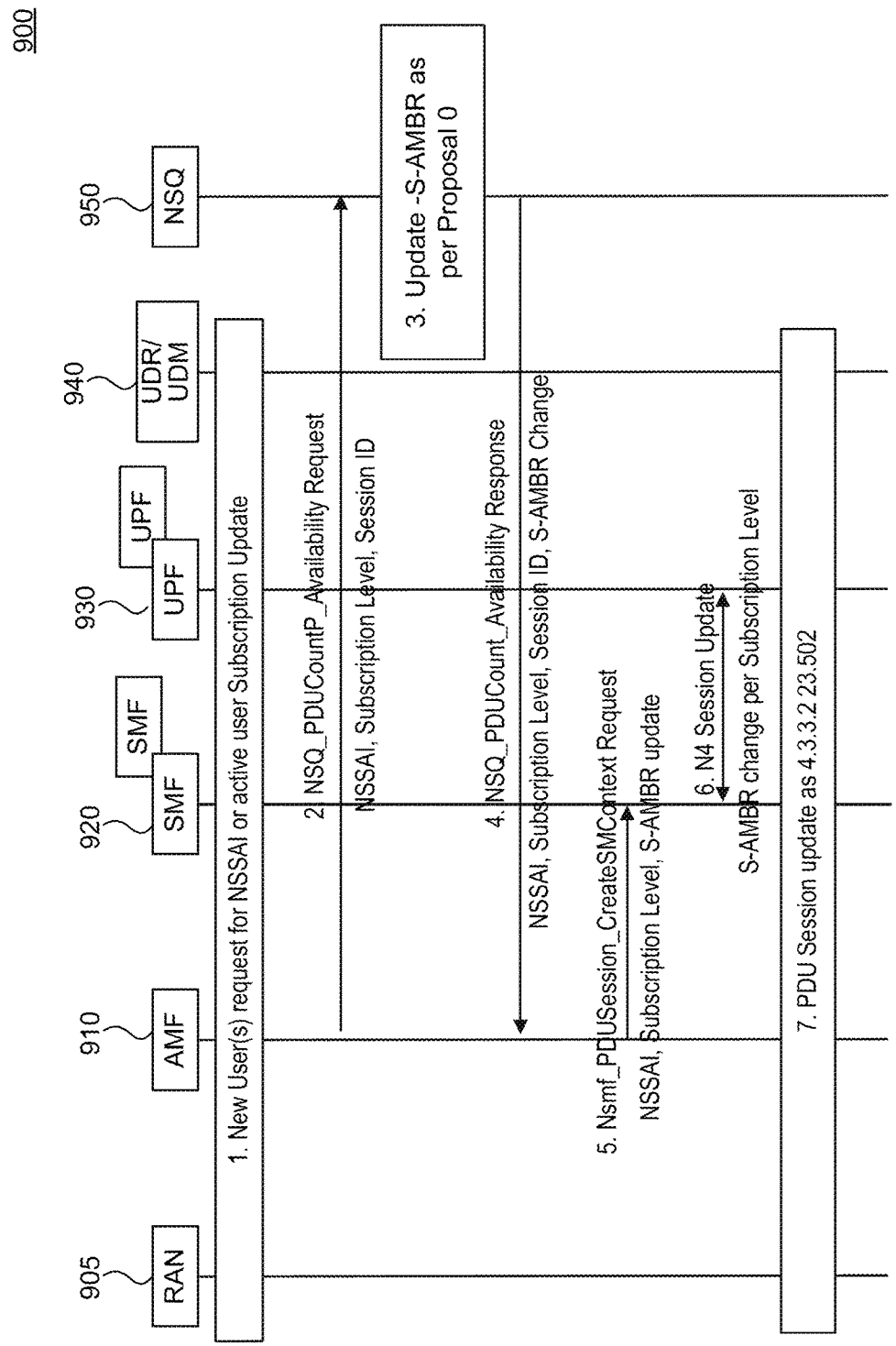
FIG. 9 illustrates the signaling for flexible S-AMBR ratio change with an AMF Request, according to aspects of the disclosure.
Figure 10:
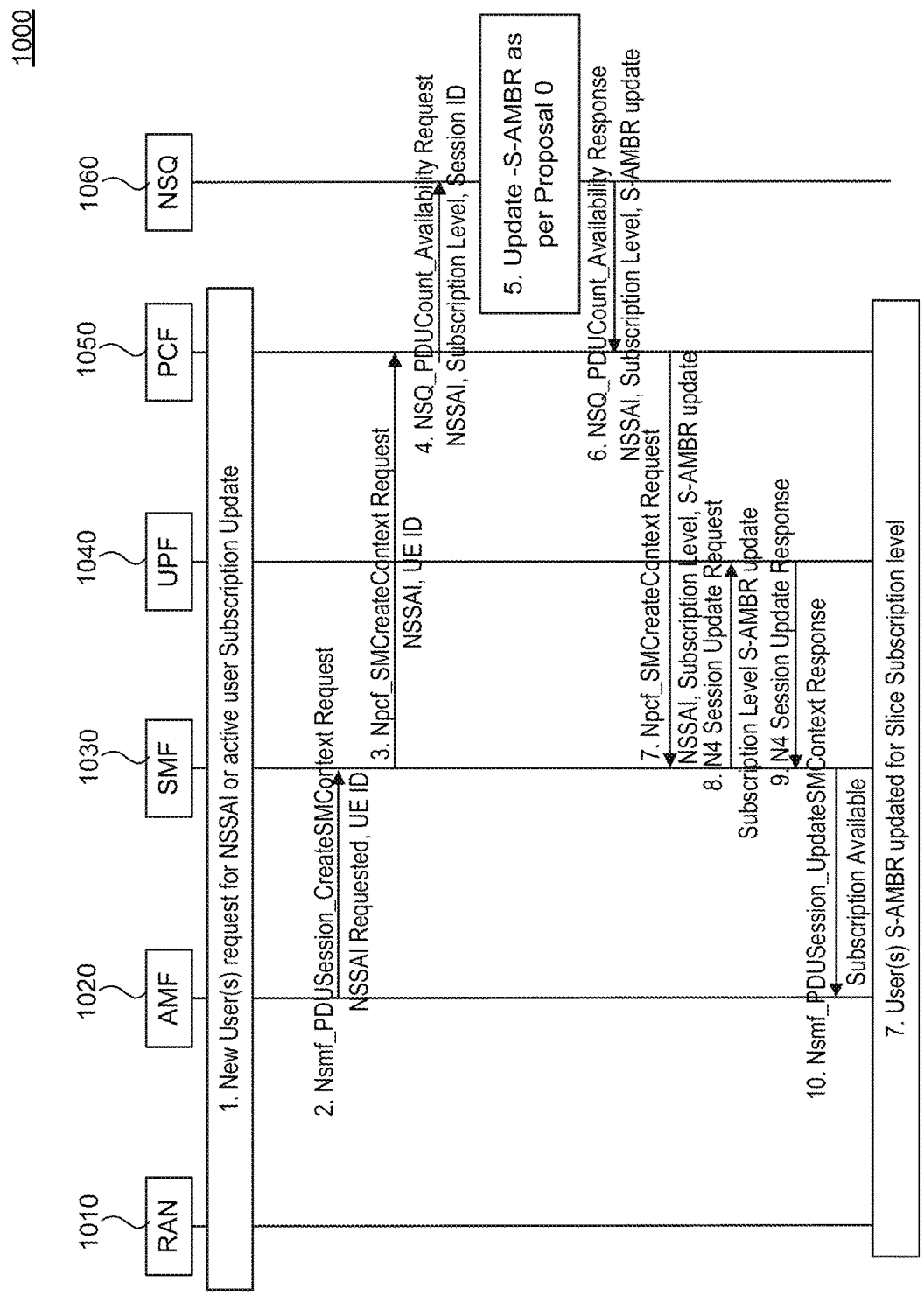
FIG. 10 illustrates the signaling for flexible S-AMBR ratio change over Subscription Levels during session setup, according to aspects of the disclosure.
Figure 11:
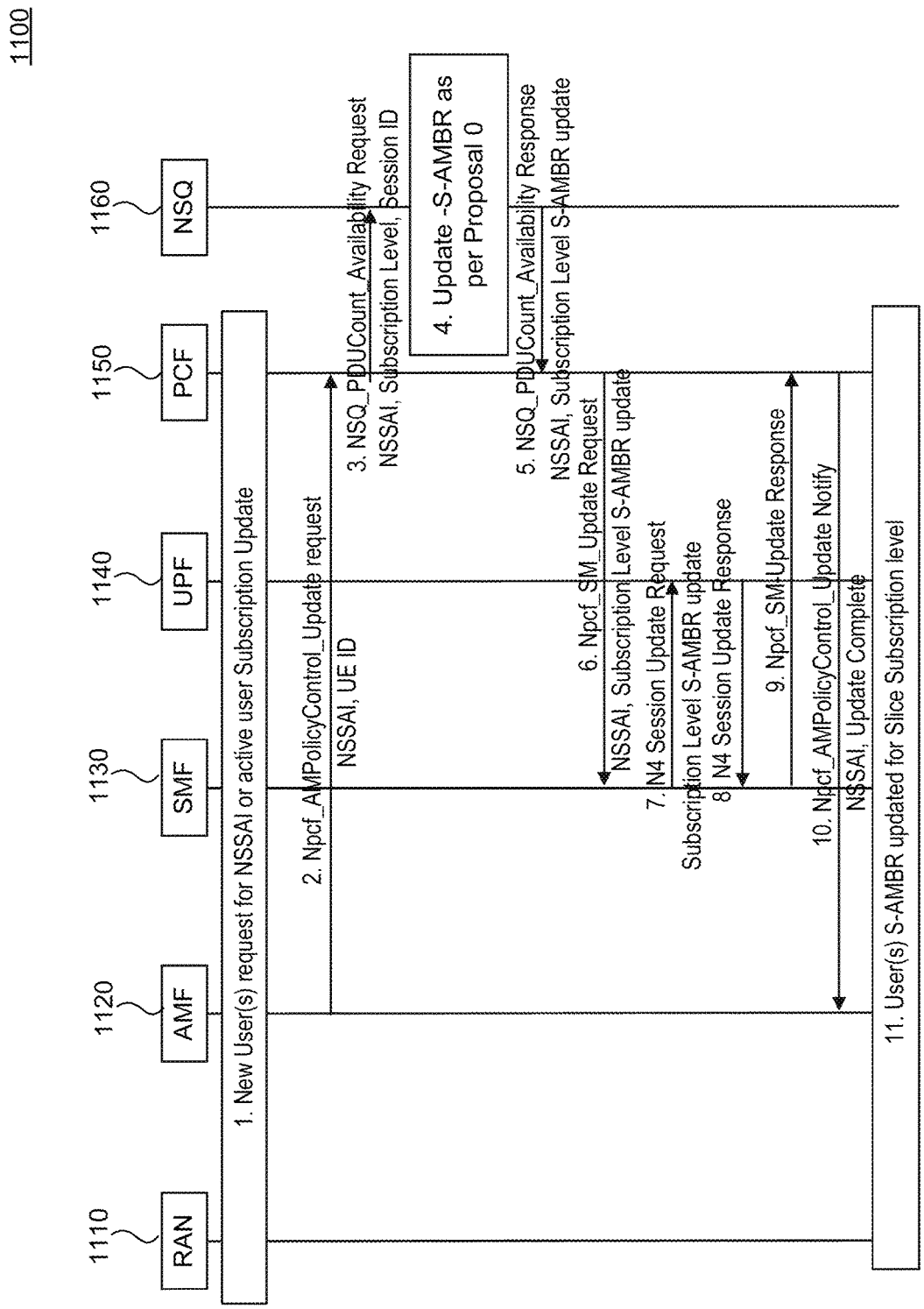
FIG. 11 illustrates the signaling for flexible S-AMBR ratio change over Subscription Levels after session setup, according to aspects of the disclosure.

FIG. 9-11 describe proposals where the SMF, based on the request from NSQ, informs the S-AMBR changes to UPF & RAN. The SMF may add an indication informing the RAN via the AMF, that the updated S-AMBR values shall not be signaled to the UE. After the PDU Session Update or Modification, all downlink data to the UE via the UPF & RAN will utilize the changed S-AMBR values as informed SMF. For all uplink data from the UE, the RAN performs enforcements to restrict the data rates as per the new S-AMBR values received from SMF.

FIG. 9 illustrates the signaling 900 for flexible S-AMBR ratio change with an AMF Request (Proposal 1), according to aspects of the disclosure. The entities involved in this signal flow are RAN 905, AMF 910, SMF 920, UPF 930, UDR/UDM 940 and NSQ 950. In item 1 of FIG. 9, a new user makes a request for NSSAI or active user subscription update. AMF 910 sends a Nnsq_PDUCountP_Availability Request to NSQ 950. NSQ 950 updates S-MBR, per Proposal 0 (as described above). NSQ 950 signals AMF 910 with an Nnsq_PDUCount Availability Response. In turn, AMF 910 signals SMF 920 with a Nsmf_PDUSession_CreateSMContext Request. In response, an N4 Session Update occurs between SMF 920 and UPF 930 to effect S-AMBR changes per subscription level. Finally, PDU Session Update is performed according to 3GPP 23.502 clause 4.3.3.2. In this approach, the QBR is reduced from all categories (Bronze, Silver and Gold users until GBR is reached), in the case of a new subscription is requested with category (where Gold, Silver or Bronze are subscription level with specific Session AMBR and GBR per slice or subscription level).

Turning now to Proposal 1, which effects a proportional control of data rate adjustments after PDU Setup from AMF to PCF. In this proposal, the initial assumptions are: NSQ is aware of the calculations required as per Proposal 0 for Subscription management transparent to UE. This is proportionate equivalent increment and decrement of S-AMBR as per usage pattern of Subscription Levels.

The steps in Proposal 1 are as follows. Step 1 is: New User(s) request for NSSAI or active Session requests Upgrade in Subscription Levels. Step 2 is: AMF invokes Nnsq_PDUCount_Availability Request with respective Subscription level of UE(s) with the Slice requested for this session. Step 3 is: NSQ does the calculation on whether the UE can be provided services with available slice or not depending upon the reserve Slice AMBR & UE S-AMBR. It is noted as follows: This is defined either by a percentage basis or on basis of QBR defined in Proposal 0. There shall always be in equivalent and proportional ratio change in the reduction of current S-AMBR for Subscription levels to accommodate new requests. Step 4 is: NSQ, in case required resources are not available, will request AMF to forward request to SMF(s) to update the Subscription level S-AMBR and take out a small part (QBR count) out of current S-AMBR available for UE(s). Step 5 is: AMF will forward this request to SMF(s) with Nsmf_SMUpdate context request enclosing the Subscription level S-AMBR changes at UPF(s) level. Step 6 is: SMF uses N4 Session Update Request/Response with UPF(s) to update the S-AMBR provided to different Subscription level in User Plane for respective DNN. The following is noted: This Subscription level S-AMBR change shall be always subjected to limit between Session AMBR & GBR available/subscribed by the current Slice/Subscription Level. Step 7 is: PDU Session Creation and updating continues as per 23.502. It is noted as follows: Slice AMBR is handled opaque to UE process with Session Management and Policy changes, in case it is required.

FIG. 10 illustrates the signaling 1000 for flexible S-AMBR ratio change over Subscription Levels during session setup (Proposal 1a), according to aspects of the disclosure. The entities involved in this signal flow are RAN 1010, AMF 1020, SMF 1030, UPF 1040, PCF 1050 and NSQ 1060. In item 1 of FIG. 10, a new user makes a request for NSSAI or active user subscription update. AMF 1020 sends a Nsmf_PDUSession_CreateSMContext Request to SMF 1030. SMF 1030 sends an Npcf_SMCCreateContext Request PCF 1050. PCF 1050 signals NSQ 1060 with an Nnsq_PDUCount_Availability Request. NSQ 1060 updates S-AMBR, per Proposal 0 (as described above). NSQ 1060 signals PCF 1050 with an Nnsq_PDUCount Availability Response. In turn, PCF 1050 signals SMF 1030 with a Npcf_SMCreateContext Request. In response, an N4 Session Update occurs between SMF 1030 and UPF 1040 to effect S-AMBR changes per subscription level. SMF 1030 then signals AMF 1020 with a Nsmf_PDUSession_UpdateSMContext Response. Finally, User(s)S-AMBR are updated for slice subscription level. In this approach, the QBR is reduced from all categories (Bronze, Silver and Gold users until GBR is reached), in the case of a new subscription is requested with category (where Gold, Silver or Bronze are subscription level with specific Session AMBR and GBR per slice or subscription level).

Details on Proposal 1a (Proportional Control of data rate adjustments during addition of new Subscriber) are described, according to aspects of the disclosure. The Initial Assumptions are: (a) NSQ is aware of the calculations required as per Proposal 0 for Subscription management transparent to UE. (b) This is proportionate equivalent increment and decrement of S-AMBR as per usage pattern of Subscription Levels.

The steps of Proposal 1a are as follows. In step 1, New User(s) request for NSSAI or active Session requests Upgrade in Subscription Levels. In step 2, AMF forwards the PDU Session request to respective SMF with the requested NSSAI & UE ID. In step 3, SMF requests PCF to provide SM Policy for UE ID and whether this request can be associated with the required NSSAI 4. In step 4, PCF invokes Nnsq_PDUCount_Availability Request with Subscription level stored in PCF for this PDU session requested by UE with the Slice requested for this session. In step 5, NSQ does the calculation on whether new UE(s) can be provided services with available reserve Slice AMBR. The following is noted: This is defined either by a percentage basis or on basis of QBR defined in Proposal 0. There shall always be in equivalent and proportional ratio change in the reduction of S-AMBR for Subscription levels to accommodate new requests. In step 6: In case required QBR count are not available, it will request PCF to forward request to SMF to update the S-AMBR with respective Subscription level ratio and reduce QBR out of current S-AMBR for different Subscription Levels. In step 7: PCF will forward this request to SMF with Nsmf_SMCreate/Update context request enclosing the S-AMBR/Subscription Level changes at UPF level In step 8: SMF uses N4 Session Update Request with UPF to update the S-AMBR provided to different Subscription level in User Plane. The following is noted: This Subscription level S-AMBR change shall be always subjected to limit between Session AMBR & Subscription/Slice GBR available/subscribed by the current Slice. In step 9: UPF acknowledges the change with N4 Session Update Response to SMF. In step 10: Now SMF responds to AMF with information about this SM Context that it can proceed with completion of the Session Creation/Updating with the required subscription level. The following is noted: Slice AMBR is handled opaque to UE process with Session Management and Policy changes, in case it is required.

FIG. 11 illustrates the signaling 1100 for flexible S-AMBR ratio change over Subscription Levels after session setup (Proposal 1b), according to aspects of the disclosure. The entities involved in this signal flow are RAN 1110, AMF 1120, SMF 1130, UPF 1140, PCF 1150 and NSQ 1160. In item 1 of FIG. 11, a new user makes a request for NSSAI or an active user subscription update. AMF 1120 sends a Npcf_AMPolicyControl_Update Request to PCF 1150. PCF 1150 signals NSQ 1160 with an Nnsq_PDUCount_Availability Request. NSQ 1160 updates S-AMBR, per Proposal 0 (as described above). NSQ 1160 signals PCF 1150 with an Nnsq_PDUCount Availability Response. In turn, PCF 1150 signals SMF 1130 with a Npcf_SMUpdate Request. In response, an N4 Session Update occurs between SMF 1130 and UPF 1140 to effect S-AMBR changes per subscription level. SMF 1130 then signals PCF 1150 with a Npcf_SMUpdate Response. PCF 1150 signals AMF 1120 with a Npcf_AMPolicyControl_Update Notify signal. Finally, User(s)S-AMBR are updated for slice subscription level. In this approach, the QBR is reduced from all categories (Bronze, Silver and Gold users until GBR is reached), in the case of a new subscription is requested with category (where Gold, Silver or Bronze are subscription level with specific Session AMBR and GBR per slice or subscription level).

Details on Proposal 1b (Proportional Control of data rate adjustments after PDU Setup from AMF to PCF) are now described. For this proposal, the Initial Assumptions are: (a) NSQ is aware of the calculations required as per Proposal 0 for Subscription management transparent to UE; and (b) This is proportionate equivalent increment and decrement of S-AMBR as per usage pattern of Subscription Levels.

The steps of Proposal 1b are as follows. In step 1: New User(s) request for NSSAI or active Session requests Upgrade in Subscription Levels. In step 2: While the PDU session creation is ongoing, AMF requests PCF for AM Policy control after getting info from NSSF regarding UE(s) Subscription Levels, AMBRs & GBRs. In step 3: PCF invokes Nnsq_PDUCount_Availability Request with respective Subscription level of UE(s) with the Slice requested for this session. In step 4: NSQ does the calculation on whether the UE can be provided services with available slice or not depending upon the reserve Slice AMBR & UE SAMBR. The following is noted: This is defined either by a percentage basis or on basis of QBR defined in Proposal 0. There shall always be in equivalent and proportional ratio change in the reduction of current S-AMBR for Subscription levels to accommodate new requests. In step 5: NSQ, in case required resources are not available, will request PCF to forward request to SMF to update the Subscription level S-AMBR and take out a small part (QBR count) out of current S-AMBR available for UE(s). In step 6: PCF will forward this request to SMF with Nsmf_SMCreate/Update context request enclosing the Subscription level S-AMBR changes at UPF level. In step 7: SMF uses N4 Session Update Request with UPF to update the S-AMBR provided to different Subscription level in User Plane. The following is noted: This Subscription level S-AMBR change shall be always subjected to limit between Session AMBR & GBR available/subscribed by the current Slice/Subscription Level. In step 8: UPF responds to SMF with acknowledgment that these changes have been completed from User Plane. In step 9: Now SMF responds to PCF with information about this SM Context that it can proceed with completion of the Session Policy Modifications. In step 10: PCF forwards the policy updating and creation/modification of UE Context for this Slice Session. The following is noted: Slice AMBR is handled opaque to UE process with Session Management and Policy changes, in case required.

Figure 12:
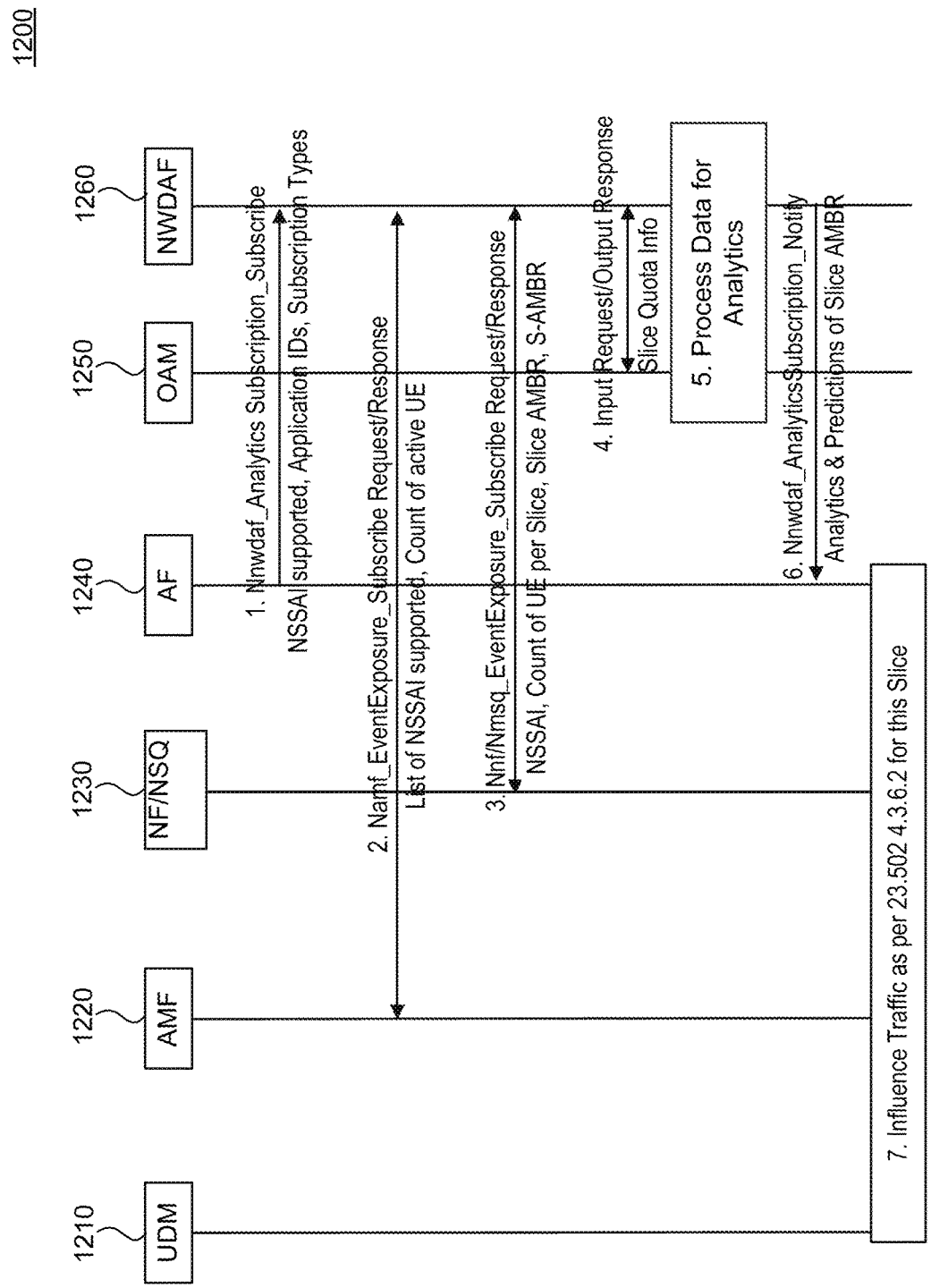
FIG. 12 illustrates the signaling for NWDAF based data rate adjustment analytics and predictions with AF Request, according to aspects of the disclosure.

FIG. 12 illustrates the signaling 1200 for NWDAF based data rate adjustment analytics and predictions with AF Request (Proposal 2), according to aspects of the disclosure. The entities involved in this signal flow are UDM 1210, AMF 1220, NF/NSQ 1230, AF 1240, OAM 1250 and NWDAF 1260. In item 1 of FIG. 12, AF 1240 sends a Nnwdaf_Analytics Subscription_Subscribe signal to NWDAF 1260. In response, AMF 1220 and NWDAF 1260 exchange a Namf_EventExposure_Subscribe Request/Response. Next, NF/NSQ 1230 and NWDAF 1260 exchange a Nnf/Nmsq_EventExposure_Subscribe Request/Response. Following this, OAM 1250 and NWDAF 1260 exchange an Input Request/Output Response. Following this, process data for analytics is performed. Next, NWDAF 1260 sends a Nnwdaf_AnalyticsSubscription Notify to AF 1240. Finally, traffic is influenced based on 3GPP 23.502, clause 4.3.6.2 for this slice.

Details on Proposal 2 (NWDAF based data rate adjustment analytics and predictions with AF Request) are now described, in accordance with aspects of the disclosure. The Initial Assumptions include: (a) NSQ is aware of the calculations required as per Proposal 0 for Subscription management transparent to UE; and (b) This is proportionate equivalent increment and decrement of Slice resources as per usage pattern.

The steps of Proposal 2 are as follows. In step 1: AF requests NWDAF for Analytics & predictions for patterns for efficient resource management for Slice Sessions. In step 2: NWDAF collects UE group Slice and mobility information from AMF. In step 3: NWDAF collects Slice AMBR, Session AMBR, S-AMBR, Subscription Levels and count availability during different time of day from NSQ/NF. In step 4: NWDAF gets quota information along with the GBR for Slice service from OAM. In step 5: NWDAF does calculation and provides analytics and predictions about: What time usage is more, thus S-AMBR should be reserved for UE in different subscription levels, amount of resources to be reserved for UE group mobility in geographical location (Tracking level as per Tracking or Registration areas). In step 6: This Analytics and Prediction is provided to AF to invoke respective service and Policy change as 23.502 and handle Slice resources on user plane with efficient and proportionate reduction and increment in service quality. In step 7: AF uses this prediction as per the Events subscribed to different NF serving for respective NSSAI and Session ID.

Figure 13:
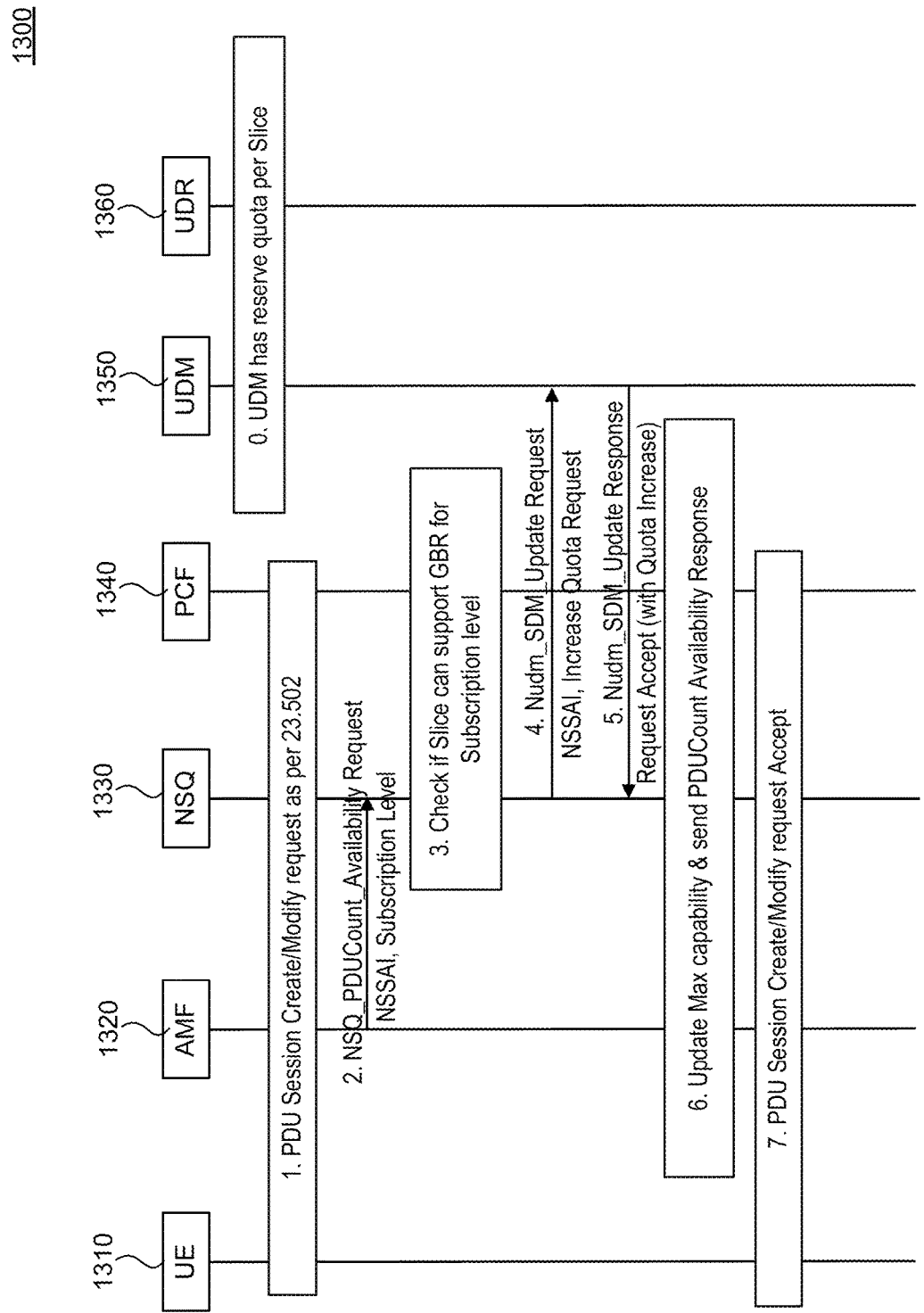
FIG. 13 illustrates the signaling for a quota update attempt with UDR with NSQ based on an AMF Request, according to aspects of the disclosure.

FIG. 13 illustrates the signaling 1300 for a quota update attempt with UDR with NSQ based on an AMF Request (Proposal 3a), according to aspects of the disclosure. The entities involved in this signal flow are UE 1310, AMF 1320, NSQ 1330, PCF 1340, UDM 1350 and UDR 1360. In item 0 of FIG. 13, UDM has a reserve quota per Slice. In item 1, UE makes a PDU Session Create/Modify Request, as per 3GPP 23.502. In item 2, AMF 1320 makes a Nnsq_PDU-Count_Availability Request to NSQ 1330. In item 3, a check is made if the Slice can support BGR for the Subscription Level. In item 4, Nudm_SDM_Update Request is made from NSQ 1330 to UDM 1350. In item 5, in response, UDM 1350 responds with a Nudm_SDM_Update Response to NSQ 1330. In item 6, an update on max capability is done, and the PDUCount Availability Response is performed. In item 7, PDU Session Create/Modify request is accepted.

Details on Proposal 3a (Quota Update Attempt with UDR with NSQ) are now described. The steps are as follows. In step 0: UDM gets multiple Slice quota details from UDR. In step 1: UE initiates PDU Session Create/Modify Request to use NSSAI for particular service to AMF through N1 interface. In step 2: AMF initiates NSQ PCU Count Availability request for this PDU Session on the requested Slice and Rates for this Subscription Level of UE. In step 3: NSQ checks regarding the policy update required in case the current request from UE and AMF cannot be entertained due to RATE limitation. In step 4: NSQ initiated Quota request to UDB for maintenance and increment of Quota Request in case previous limits were provide only for a percentage of total quota available for the slice. The following is noted: In the above condition, it is expected that UDM may limit the primary Quota to 80-90% of the Slice subscription to ensure that there is possibility to increase UE count when required and not change the bit rate of active UEs on the Slice session. In step 5: UDM responds with whether the Quota is exhausted or extended for utility of New UE from the reserve bit rate for the initial Slice Subscription levels. In step 6: AMF is notified about this update and AMF can proceed with providing the UE with Slice or rejecting the PDU session request with appropriate Reject cause. The following is noted: AMF and NSQ are also required to maintain the list of Rate limits provided by UDM provided in Subscription Levels at step 5. In step 7: UE receives the PDU session response with Accept or Reject on current Slice.

Figure 14:
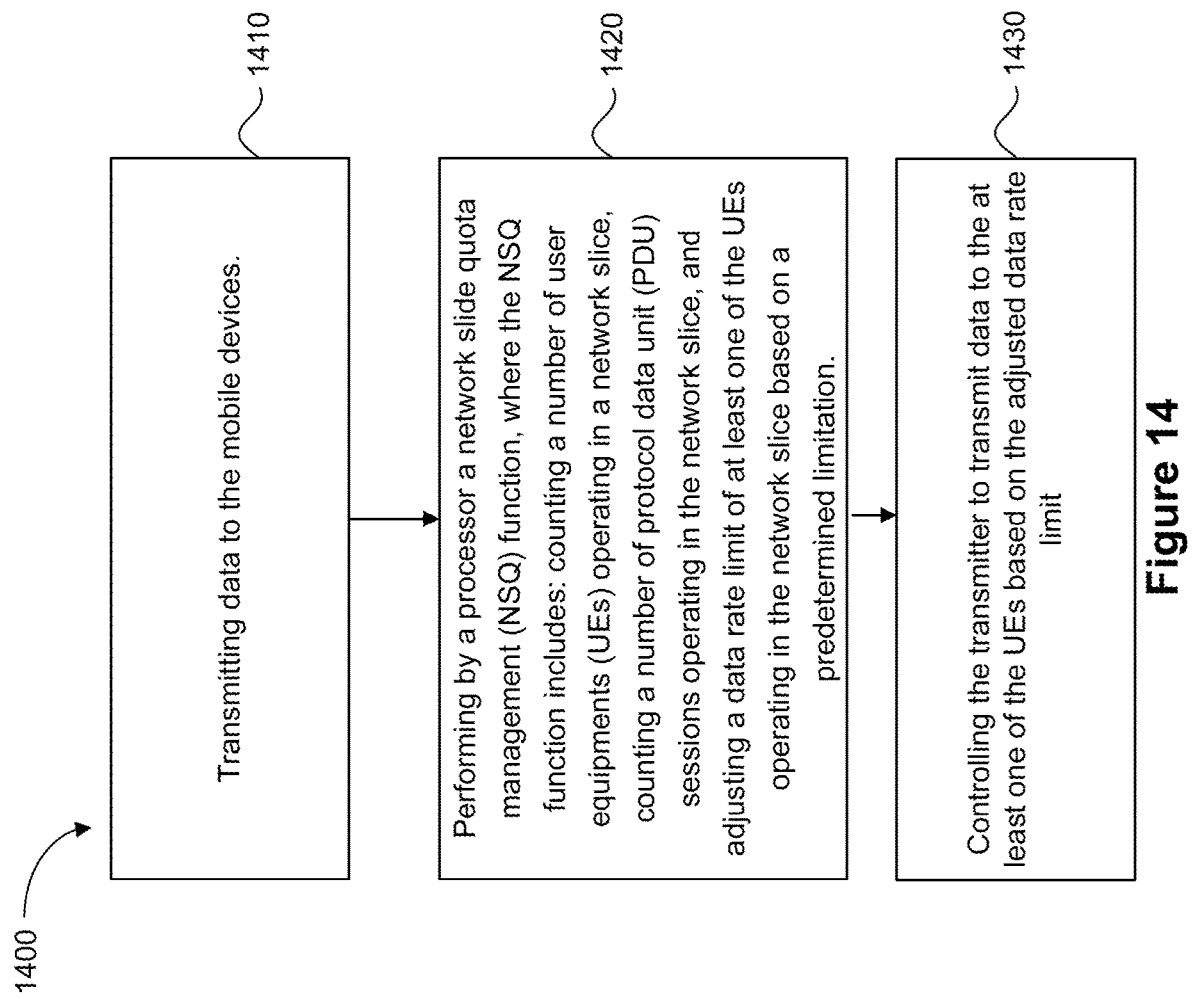
FIG. 14 depicts an example procedure for practicing the various aspects discussed herein.

FIG. 14 illustrates a flowchart diagram of a method 1400 for communication by a network node with mobile devices in a wireless communication system. The method includes the following steps. Step 1410 of the method includes transmitting data to the mobile devices. Step 1420 of the method includes performing by a processor a network slide quota management (NSQ) function, where the NSQ function includes: counting a number of user equipments (UEs) operating in a network slice, counting a number of protocol data unit (PDU) sessions operating in the network slice, and adjusting a data rate limit of at least one of the UEs operating in the network slice based on a predetermined limitation. Step 1430 of the method includes controlling the transmitter to transmit data to the at least one of the UEs based on the adjusted data rate limit.

Figure 15:
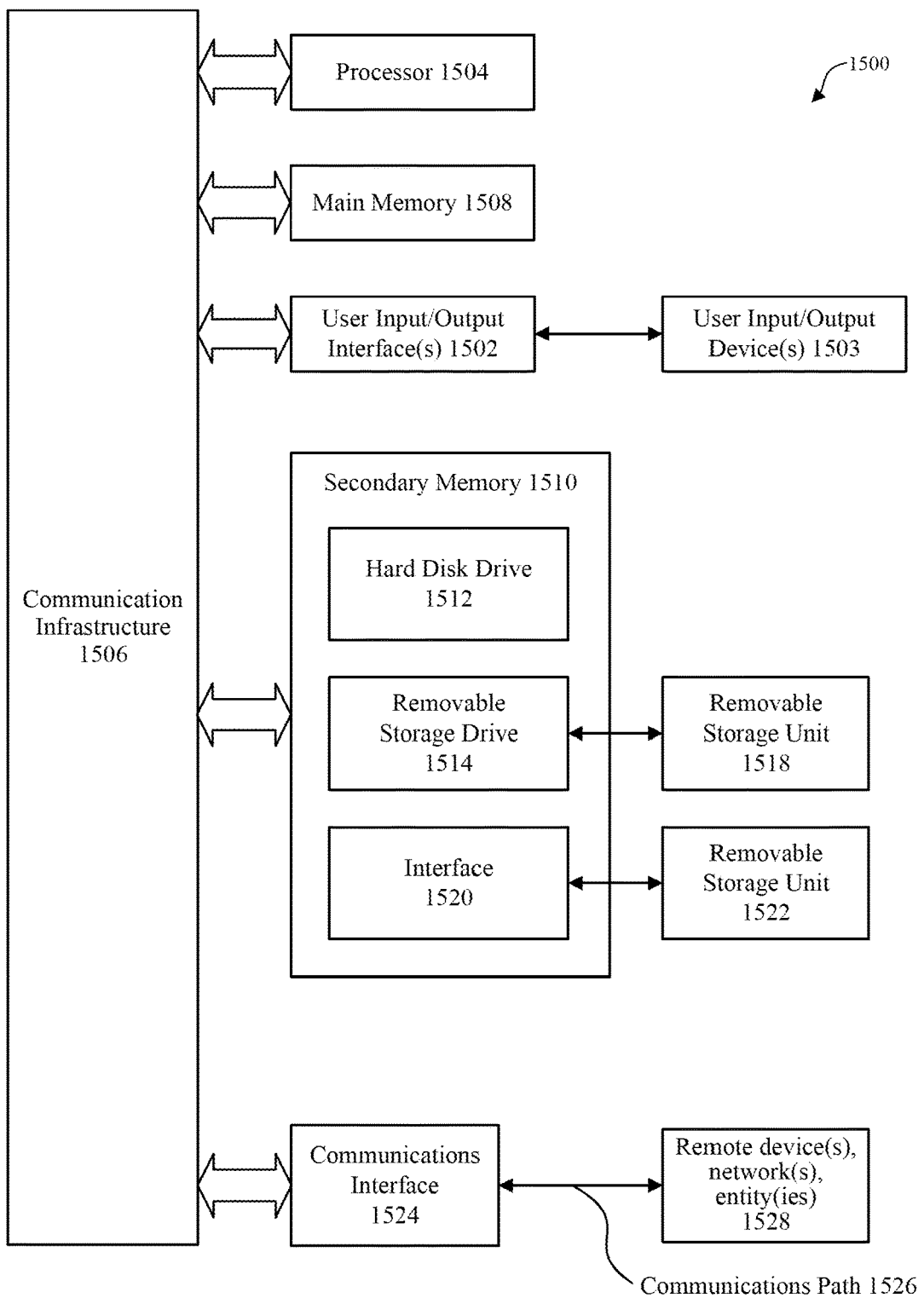
FIG. 15 is an example computer system for implementing some aspects or portion(s) thereof.

Various aspects can be implemented, for example, using one or more computer systems, such as computer system 1500 shown in FIG. 15. Computer system 1500 can be any well-known computer capable of performing the functions described herein such as devices 901, 903, 905 of FIG. 9, or 1000 of FIG. 10. Computer system 1500 includes one or more processors (also called central processing units, or CPUs), such as a processor 1504. Processor 1504 is connected to a communication infrastructure 1506 (e.g., a bus.) Computer system 1500 also includes user input/output device(s) 1503, such as monitors, keyboards, pointing devices, etc., that communicate with communication infrastructure 1506 through user input/output interface(s) 1502. Computer system 1500 also includes a main or primary memory 1508, such as random access memory (RAM). Main memory 1508 may include one or more levels of cache. Main memory 1508 has stored therein control logic (e.g., computer software) and/or data.

Computer system 1500 may also include one or more secondary storage devices or memory 1510. Secondary memory 1510 may include, for example, a hard disk drive 1512 and/or a removable storage device or drive 1514. Removable storage drive 1514 may be a floppy disk drive, a magnetic tape drive, a compact disk drive, an optical storage device, tape backup device, and/or any other storage device/drive.

Removable storage drive 1514 may interact with a removable storage unit 1518. Removable storage unit 1518 includes a computer usable or readable storage device having stored thereon computer software (control logic) and/or data. Removable storage unit 1518 may be a floppy disk, magnetic tape, compact disk, DVD, optical storage disk, and/any other computer data storage device. Removable storage drive 1514 reads from and/or writes to removable storage unit 1518 in a well-known manner.

According to some aspects, secondary memory 1510 may include other means, instrumentalities or other approaches for allowing computer programs and/or other instructions and/or data to be accessed by computer system 1500. Such means, instrumentalities or other approaches may include, for example, a removable storage unit 1522 and an interface 1520. Examples of the removable storage unit 1522 and the interface 1520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1500 may further include a communication or network interface 1524. Communication interface 1524 enables computer system 1500 to communicate and interact with any combination of remote devices, remote networks, remote entities, etc. (individually and collectively referenced by reference number 1528). For example, communication interface 1524 may allow computer system 1500 to communicate with remote devices 1528 over communications path 1526, which may be wired and/or wireless, and which may include any combination of LANs, WANs, the Internet, etc. Control logic and/or data may be transmitted to and from computer system 1500 via communication path 1526.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1500, main memory 1508, secondary memory 1510 and removable storage units 1518 and 1522, as well as tangible articles of manufacture embodying any combination of the foregoing. Such control logic, when executed by one or more data processing devices (such as computer system 1500), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 15. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "an aspect," "an example aspect," or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

The invention claimed is:

1. A network node for communicating with user equipments (UEs) in a wireless communication system, the network node comprising:
   a transmitter configured to transmit data to the UEs; and
   processor circuitry configured to:
      perform a network slice quota (NSQ) management function, the NSQ management function including:
         counting a number of the UEs operating in a network slice;
         counting a number of protocol data unit (PDU) sessions operating in the network slice; and
         adjusting a data rate limit of at least one of the UEs operating in the network slice based on an aggregate maximum bit rate (AMBR) for the network slice reaching or exceeding a predetermined data rate limitation of the network slice, the AMBR for the network slice being an aggregate of respective bit rates for each PDU session included in the number of PDU sessions, the adjusting being made in blocks of predetermined quantized bit rates (QBRs), and wherein the adjusting further includes adding an additional UE to a set of UEs operating in the network slice using a reserve bit rate without changing bit rates of the set of UEs operating in the network slice; and
   cause to control the transmitter to transmit the data to the at least one of the UEs based on the adjusted data rate limit.

2. The network node of claim 1, wherein AMBR for the network slice is an aggregate of session-aggregate maximum bit rate (session-AMBR) values of all non-guaranteed bit rate sessions for the network slice plus an aggregate of maximum flow bit rate (MFBR) of all guaranteed bit rate (GBR) sessions for the network slice.

3. The network node of claim 1, wherein the predetermined data rate limitation is an available maximum bit rate (AvMBR) for the network slice.

4. The network node of claim 1, wherein the adjusting includes reducing the data rate limit of the at least one of the UEs by a predetermined percentage.

5. The network node of claim 1, wherein the adjusting includes reducing in a proportional ratio across one or more subscription levels in the network slice.

6. The network node of claim 1, wherein the processor circuitry is further configured to:
   reject a new protocol data unit (PDU) request when the AMBR for the network slice would exceed an available maximum bit rate (AvMBR) for the network slice.

7. The network node of claim 1, wherein the adjusting is initiated by a Session Management Function (SMF) for existing PDU sessions associated with the network slice, and wherein the adjusting further includes informing the adjusted data rate limit to a User Plane Function (UPF) and a RAN (Radio Access Network).

8. The network node of claim 7, wherein the adjusting further includes performing adjustment via a PDU Session Modification procedure, wherein a control plane signals the adjusted data rate limit to the at least one of the UEs, following which a portion of uplink user plane data and at least a portion of downlink user plane data each adhere to the adjusted data rate limit.

9. The network node of claim 7, wherein the adjusting includes performing adjustment via a PDU Session Modification procedure, and wherein the at least one of the UEs is not informed of the adjusted data rate limit.

10. The network node of claim 7, wherein the adjusting includes performing adjustment via a Service Data Adaptation Protocol (SDAP) procedure only for all guaranteed bit rate (GBR) sessions for the network slice.

11. The network node of claim 7, wherein the adjusting includes adjusting all non-guaranteed bit rate sessions for the network slice until a predetermined threshold has been reached, followed by adjusting all the guaranteed bit rate (GBR) sessions for the network slice.

12. The network node of claim 1, further comprising rolling back to an original data rate limit of the at least one of the UEs when a predetermined number of protocol data unit (PDU) sessions are released.

13. The network node of claim 1, wherein the processor circuitry is further configured to issue a cause code when the predetermined data rate limit is reached.

14. A method for communication by a network node with user equipments (UEs) in a wireless communication system, the method comprising:
 transmitting data to the UEs; and
 performing by a processor a network slide quota (NSQ) management function, the NSQ management function including:
  counting a number of the UEs operating in a network slice;
  counting a number of protocol data unit (PDU) sessions operating in the network slice; and
  adjusting a data rate limit of at least one of the UEs operating in the network slice based on an aggregate maximum bit rate (AMBR) for the network slice reaching or exceeding a predetermined data rate limitation of the network slice, the AMBR for the network slice being an aggregate of respective bit rates for each PDU session included in the number of PDU sessions, the adjusting being made in blocks of predetermined quantized bit rates (QBRs), and wherein the adjusting further includes adding an additional UE to a set of UEs operating in the network slice using a reserve bit rate without changing bit rates of the set of UEs operating in the network slice; and
 controlling a transmitter to transmit the data to the at least one of the UEs based on the adjusted data rate limit.

15. The method of claim 14, wherein the AMBR for the network slice is an aggregate of session-aggregate maximum bit rate (session-AMBR) values of all non-guaranteed bit rate sessions for the network slice plus an aggregate of maximum flow bit rate (MFBR) of all guaranteed bit rate (GBR) sessions for the network slice.

16. The method of claim 14, further comprising:
 rejecting a new protocol data unit (PDU) request when an AMBR-S-NSSAI would exceed an available maximum bit rate (AvMBR) for the network slice.

17. The method of claim 14, wherein the adjusting includes using an Access and Mobility Management Function (AMF) Request sent to a Session Management Function (SMF) during an addition of a new subscriber to the network slice.

18. The method of claim 14, wherein the adjusting includes using an Access and Mobility Management Function (AMF) Request sent to a Policy Control Function (PCF) following a PDU session setup.

19. The method of claim 14, wherein the adjusting includes using an Application Function (AF) Request sent to a Network Data Analytics Function (NWDAF) for use of predictive analytics.

20. A user equipment (UE) for communicating with a network node in a wireless communication system, the UE comprising:
 a transmitter configured to transmit data to the network node;
 a receiver configured to receive data from the network node; and
 processor circuitry configured to:
  obtain an indication from the received data of an adjusted data rate limit from a network slice quota (NSQ) management function in the network node, wherein the NSQ management function determines the adjusted data rate limit based on:
  counting a number of user equipments (UEs) operating in a network slice;
  counting a number of protocol data unit (PDU) sessions operating in the network slice; and
 calculating the adjusted data rate limit of at least one of the UEs operating in the network slice based on an aggregate maximum bit rate (AMBR) for the network slice reaching or exceeding a predetermined data rate limitation of the network slice, the AMBR for the network slice being an aggregate of respective bit rates for each PDU session included in the number of PDU sessions, the calculating using adjustments made in blocks of predetermined quantized bit rates (QBRs), and wherein the adjusting further includes adding an additional UE to a set of UEs operating in the network slice using a reserve bit rate without changing bit rates of the set of UEs operating in the network slice; and
 cause to control the transmitter to transmit the data to the network node based on the adjusted data rate limit.

* * * * *

UNITED STATES PATENT AND TRADEMARK OFFICE
CERTIFICATE OF CORRECTION

PATENT NO. : 12,273,773 B2  
APPLICATION NO. : 17/316568  
DATED : April 8, 2025  
INVENTOR(S) : Prabhakar et al.

Page 1 of 1

It is certified that error appears in the above-identified patent and that said Letters Patent is hereby corrected as shown below:

In the Claims

In Column 22, Claim 2, Line 13, after "wherein" insert -- the --.

Signed and Sealed this  
Thirteenth Day of May, 2025

Coke Morgan Stewart  
*Acting Director of the United States Patent and Trademark Office*